US010648563B2

(12) United States Patent
Lowe

(10) Patent No.: US 10,648,563 B2
(45) Date of Patent: May 12, 2020

(54) BEARINGS FOR DRYER SEALS, FIRE RETARDANT HIGH TEMPERATURE DRYER SEALS AND RELATED METHODS

(71) Applicant: Felters of South Carolina, LLC, Roebuck, SC (US)

(72) Inventor: Vernon J. Lowe, Greenback, TN (US)

(73) Assignee: Felters of South Carolina, LLC, Roebuck, SC (US)

( * ) Notice: Subject to any disclaimer, the term of this patent is extended or adjusted under 35 U.S.C. 154(b) by 64 days.

(21) Appl. No.: 15/800,026

(22) Filed: Oct. 31, 2017

(65) Prior Publication Data

US 2018/0128373 A1 May 10, 2018

Related U.S. Application Data

(60) Provisional application No. 62/415,504, filed on Oct. 31, 2016.

(51) Int. Cl.
*F16J 15/06* (2006.01)
*F26B 11/02* (2006.01)
*D06F 58/04* (2006.01)
*F16J 15/10* (2006.01)
*D06F 58/02* (2006.01)

(52) U.S. Cl.
CPC ............ *F16J 15/065* (2013.01); *D06F 58/04* (2013.01); *F16J 15/102* (2013.01); *F16J 15/104* (2013.01); *F26B 11/024* (2013.01); *D06F 58/02* (2013.01)

(58) Field of Classification Search
CPC ......... F16J 15/065; D06F 58/04; D06F 58/02; F26B 11/024
See application file for complete search history.

(56) References Cited

U.S. PATENT DOCUMENTS

| 2,459,720 | A | * | 1/1949 | Poltorak | F16L 23/22 156/227 |
| 4,156,533 | A | * | 5/1979 | Close | F01N 3/2857 277/652 |
| 4,214,571 | A | * | 7/1980 | Scherer | F24C 15/021 126/190 |
| 5,383,316 | A | * | 1/1995 | Burke | F16J 15/065 52/218 |
| 5,407,214 | A | * | 4/1995 | Lew | F16J 15/065 277/608 |
| 5,628,520 | A | * | 5/1997 | Ueda | F16J 15/104 277/654 |

(Continued)

*Primary Examiner* — Eugene G Byrd
(74) *Attorney, Agent, or Firm* — J. Bennett Mullinax, LLC

(57) ABSTRACT

Bearings for fire retardant dryer seals, fire retardant dryer seals, and related methods are provided herein. A fire retardant dryer seal can include an elongate, flexible base substrate having a first end and a second end. The base substrate can also have a first surface and a second surface opposite the first surface. A fire retardant dryer seal can include a bearing having a first end and a second end with the bearing including a needlepunched nonwoven having a reinforced scrim and fibers with silicon therein. The first end and the second end of the base substrate secured to the first end and the second end of the bearing so that the bearing and the base substrate forms an annular shape. A heat resistant coating can be disposed on at least the first surface of the base substrate.

23 Claims, 11 Drawing Sheets

(56) References Cited

U.S. PATENT DOCUMENTS

| | | | | |
|---|---|---|---|---|
| 5,765,838 | A * | 6/1998 | Ueda | F16J 15/22 |
| | | | | 277/580 |
| 2005/0017459 | A1* | 1/2005 | Cross | D06F 58/04 |
| | | | | 277/628 |
| 2007/0044342 | A1* | 3/2007 | Burns | D06F 58/04 |
| | | | | 34/242 |
| 2007/0074419 | A1* | 4/2007 | Starrett | D06F 58/04 |
| | | | | 34/242 |
| 2013/0097937 | A1* | 4/2013 | Flasher | D06F 58/04 |
| | | | | 49/492.1 |
| 2014/0327212 | A1* | 11/2014 | Lowe | F16J 15/16 |
| | | | | 277/345 |
| 2015/0132564 | A1* | 5/2015 | Arfsten | B01J 13/18 |
| | | | | 428/312.8 |
| 2016/0187062 | A1* | 6/2016 | Lowe | F26B 25/008 |
| | | | | 277/500 |

\* cited by examiner

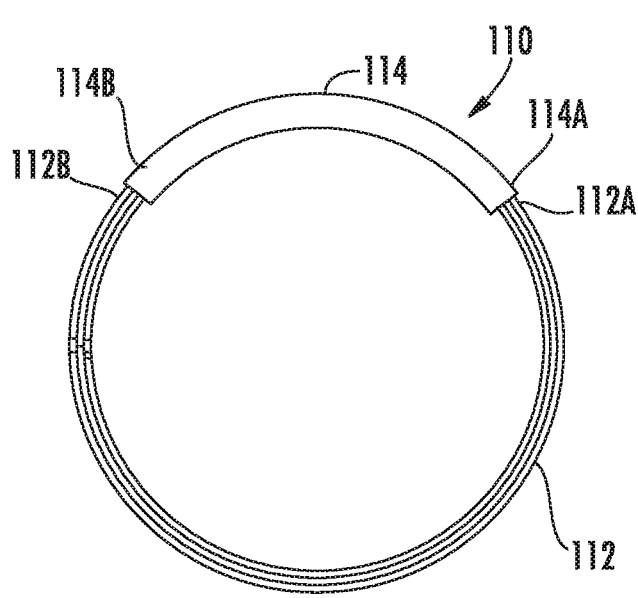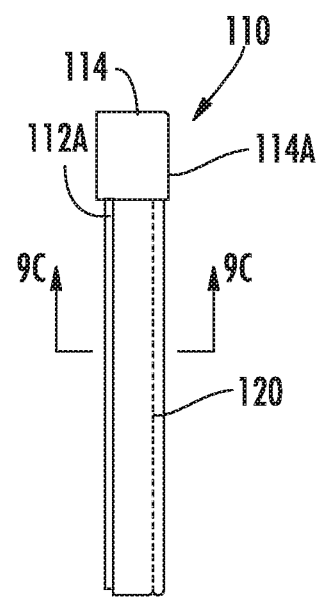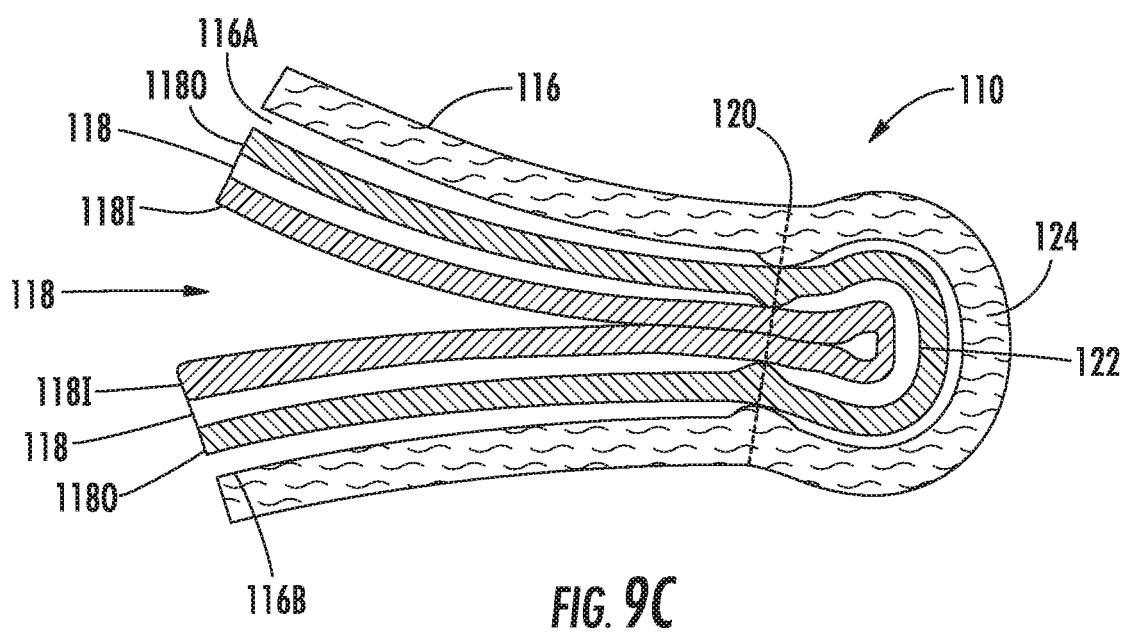
FIG. 9A   FIG. 9B
FIG. 9C

BEARINGS FOR DRYER SEALS, FIRE RETARDANT HIGH TEMPERATURE DRYER SEALS AND RELATED METHODS

RELATED APPLICATION

The presently disclosed subject matter claims the benefit of U.S. Provisional Patent Application Ser. No. 62/415,504, filed Oct. 31, 2016, the disclosure of which is incorporated herein by reference in its entirety.

TECHNICAL FIELD

The present subject matter relates to dryer seals end related methods. In particular, the present subject matter relates to bearings for dryer seals and fire retardant dryer seals for use in clothes dryer appliances that can withstand extended exposure to high temperatures and methods related to such bearings and dryer seals.

BACKGROUND

Domestic clothes dryers are a common household appliance that, in conjunction with domestic washers, have reduced the burden of laundry on many households by reducing the amount of time devoted household caregivers to washing and drying clothes. Such clothes dryers typically include a housing (also known as a bulkhead) and a rotating drum, or cylinder, supported within the housing. Commercially available air vented domestic clothes dryers use the rotating drum to tumble loads of washed clothes in a heated environment fey generally using a blower/fan to pull ambient air across heater coils to raise the temperature of air passing into the drum. The heated air is pulled through the tumbling clothes and out through a lint screen for discharge. Commercially available condensing domestic clothes dryers also use the rotating cylinder to tumble loads of laundry in a heat environment, but treat the air in a slightly different manner. These condensing domestic clothes dryers use a blower/fan to pull ambient air across heater cods into the drum, through the tumbling clothes and out through a lint screen, across a condenser coil to remove moisture, and then return to the drum.

Both types of dryers use dryer seals to support and seal the drum usually at both ends. These dryer seals perform a multitude of functions within these domestic clothes dryers. Current seals are made with felt nonwoven materials produced with varying percentages of wool and polyester and also on occasions the addition of vinyl or some low friction material. These seals can be static or dynamic to provide a bearing surface for the rotating drum or affixed to the drum and rotate providing a seal and rotating bearing surface for a fixed adjacent bulkhead of the appliance. Where the seal is static, an additional bearing feature is required to locate and centralize the drum during rotation. This bearing feature will require a flexible, durable and low friction bearing block feature to centralize the drum, self-adjust for drum tolerances, eccentricities and out of round and provide sound and vibration absorption properties. In particular, these seals are usually in the form of rings of felt which may be disposed between the housing and the drum so as to bear against the drum as it rotates. The materials of the ring can interact to form an elastic fit or may be glued into position depending on the arrangement of components.

The seats serve as a friction surface between the rotating drum and the bulkhead sections while also maintaining a seal to hold drying heat within the drum. In particular, the use of seals is desirable to reduce the friction, or prevent the creation of excess friction, between the drum and the bulkhead and to prevent air leakage between the drum and the clothes dryer cabinet which could detrimentally affect the air flow system of the dryer.

The structure of the seals can vary depending on the type, commercial brand and design of the dryer. Many currant seals have multi-layered ring structures incorporating a folded over exterior layer such as wool, blend, polyester, or polyester blend nonwoven material. These multi-layered ring structured seals can be folded and stitched to assume different shapes to perform their intended functions within an appropriate dryer design. In some embodiments, a spacer material such as polyester or polyester blend material can also be included that can be held within the folded over exterior. The folded materials can form legs that project outwardly from the folded edge. These legs can have a sealing contacting relationship with the rotating drum. In such seal embodiments, the spacer material can typically be held in place by two seams with a first positioning seam running between an upper edge of the spacer material and one side of the folded over exterior and a second holding seam extending at an inboard portion through all three layers so as to establish a coordinated stable structure.

Despite their widespread use in U.S. homes, clothes dryers are involved in a significant number of residential fires. According to some estimates, dryer fires produce annual U.S. property losses approaching $100 million, and lead to multiple consumer deaths and hundreds of injuries. Proper installation and effective maintenance of clothes dryers can significantly reduce the risk of appliance-related fires. But recent research has shown that product construction and design considerations are also important elements in building safer dryers.

The causes of electric dryer fires have been extensively researched over the past decade by the U.S. Consumer Product Safety Commission (CPSC), industry associations including the Association of Home Appliance Manufacturers (AHAM), individual appliance manufacturers, and standards organizations including Underwriters Laboratories (UL). Some research has pointed to the accumulation of lint and the subsequent reduction of air flow as a primary cause of dryer fires. Yet, other testing has supported claims that the cause of dryer fires can be attributed to a number of factors. In particular studies have found that factors such as a dryer load a dryer's electrical system, and a dryers mechanical system also played a major role in reported dryer fires.

While increased consumer education regarding risks with dryer use can help reduce the number of dryer fires, attention can be focused on the design of dryers themselves, and the ability of a dryer unit to actually contain a fire, should one occur. United States (U.S.) fire regulations have been defined by UL Appliance Containment # UL 2158, which requires that a fire in the appliance be contained within the appliance and not allowed to escape into the environment surrounding the appliance. For fires that initiate inside the drum, one potential point of egress is the mating area between the cylinder and the front door and/or rear bulkhead. Clothes dryer fires have a wide temperature range depending on the fuel value of the load plus any fuel value items in the unit construction such as plastic baffles, friction reducing rings, fittings or bulkhead components, etc. The temperatures have been tested to exceed 1300° F. and cycle between low and high values. These temperatures exceed the capability of sustaining structural integrity of traditionally used wool and polyester nonwoven materials, even FR treated polyesters.

Additionally, it has been found that the front bearing of a dryer seal that is used to hold the seal in place around the drum of a dryer if subjected to a UL 2158 Containment Test could significantly carbonize the Wool/FET blended PET internal substrate of the bearing of the dryer seal reducing its bearing height by as much as 70% or more and consequently permit the drum to drop by as much as 0.300 inches or more from its design/rotational axis position. When such a drop of the drum, occurs, oxygen can access the drum with the potential to create an intake fuel source (flame exit path) and the possibility of a hydrolysis event or "smoke explosion" with the possibility of the appliance doer being forced, or blown, open ideally it would be desirable if this "drum drop" event could be eliminated. As such, a need exists for improved bearings of the dryer seals and dryer seals that can help contain fires that initiate inside of a drum of a clothes dryer.

SUMMARY

The present subject matter provides bearings for dryer seals and dryer seals for use in clothes dryers and related methods. In particular, dryer seal bearings and dryer seals are provided that can facilitate containment of drum initiated fires within the dryers in which they are used while still providing friction reduction and air sealing capabilities while keeping the drum from dropping. Methods related to the manufacture and use of the bearings and dryer seals disclosed herein are also provided.

Thus, it is an object of the presently disclosed subject matter to provide bearings for dryer seals that have fire retardant and/or fire resistant properties and methods related to such bearings and dryer seals. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which:

FIGS. 9A-9B illustrate respectively schematic front plan and side plan views of another example embodiment of a front dryer seal comprising a bearing block and a peripheral seal body according to the present subject matter;

FIG. 9C illustrates a cross-sectional view of a portion of the seal body of the embodiment of the front dryer seal taken along the lines 9C-9C according to FIG. 9B;

Figure 1:
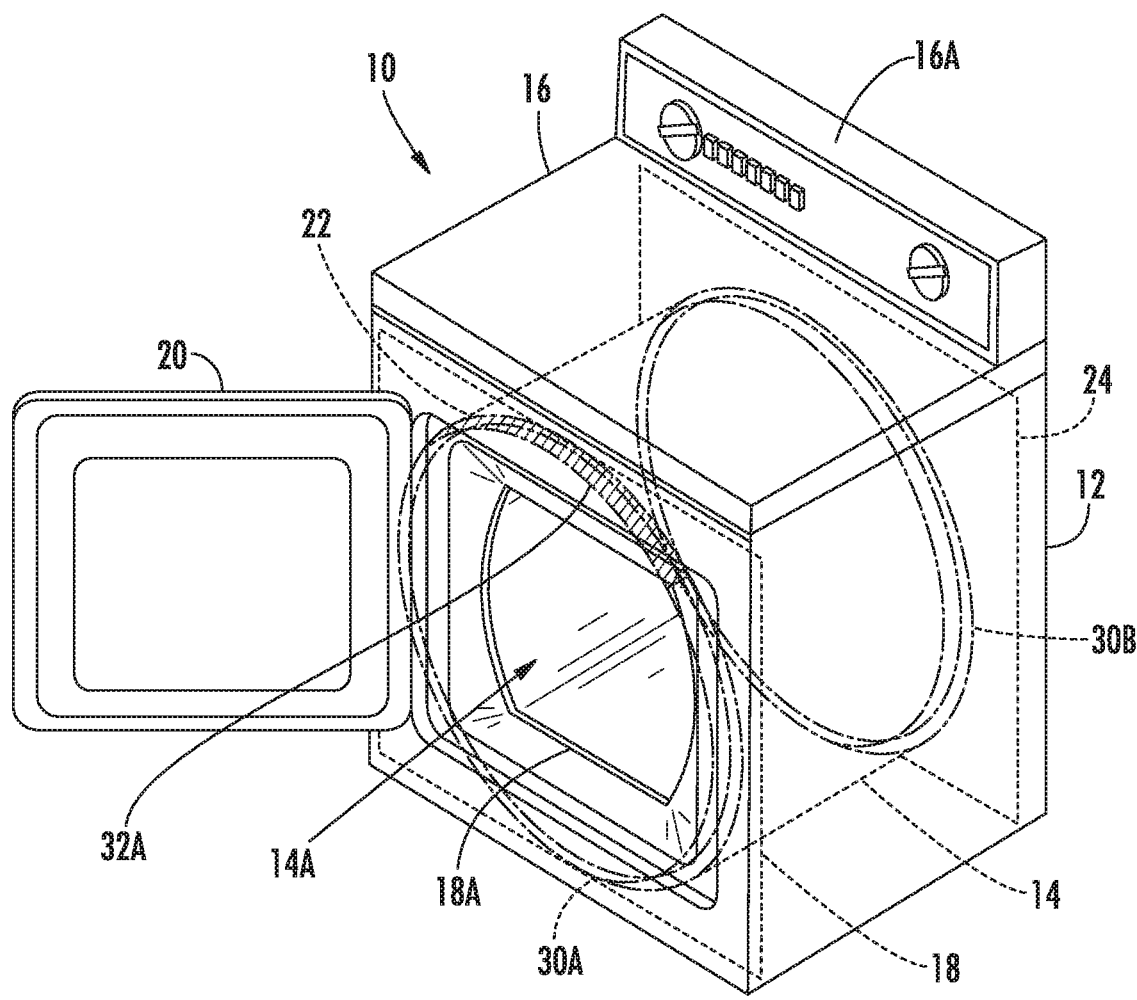
FIG. 1 illustrates a perspective view of an embodiment of a clothes dryer with the rotating drum that includes an embodiment of a seal according to the present subject matter.

Repeat use of reference characters in the present specification and drawings is intended to represent the same or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. Thus, it is intended that the present subject matter cover such modifications and variations as come within the scope of the appended claims and their equivalents. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region layer or section from another feature, element, component region, layer or section. Thus, a first feature, element, component, region, layer or section discussed below could be termed a second feature, element, component, region, layer or section without departing from the teachings of the disclosure herein.

Similarly, when a layer or coating is being described in the present disclosure as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shitted or simplified to facilitate explanation of the subject matter disclosed herein. Thus, the features, elements or components illustrated in the figures are schematic in nature and their shapes and/or positions are not intended to illustrate the precise configuration of the subject matter and are not intended to limit the scope of the subject matter disclosed herein.

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an avenge size of greater than 1 μm.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5 as examples.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "thermoplastic" is used herein to mean any material formed from a polymer which softens and flows when heated; such a polymer may be heated and softened a number of times without suffering any basic alteration in characteristics, provided heating is below the decomposition temperature of the polymer. Examples of thermoplastic polymers include, by way of illustration only, polyolefins, polyesters, polyamides, polyurethanes, acrylic ester polymers and copolymers, polyvinyl chloride, polyvinyl acetate, etc. and copolymers thereof.

Dryer seals have been shown and described detail in U.S. Provisional Patent Application Ser. No. 61/806,944 and U.S. patent application Ser. No. 14/242,855, which are incorporated herein in their entireties. Additionally, Dryer seals have been shown and described in detail in U.S. Provisional Patent Application Ser. No. 62/044,405 and U.S. patent application Ser. No. 14/842,827, which are also incorporated herein in their entireties. The dryer seals described provide ample background and understanding of the operation of the dryer seal and description of the improvements to the dryer seals that are enhanced by the present description.

The front bearing for the seal disclosed and described in U.S. Provisional Patent Application Ser. No. 62/044,405 and U.S. patent application Ser. No. 14/842,827 has been subjected to a UL 2158 simulation test using the Celcon ring bearing/drum component as a fuel source to carbonize the bearing of the dryer seal and evaluate the 'drum drop' to establish a benchmark for any alternative design. From a nominal component height of the dryer seal beaming of about 0.413 inches, the major carbonized bearing contraction was between about a 0.200 inch to about 0.230 inch reduction. Typically, during the 2158 Containment testing the front bearing dryer seal will be subject to periods of exposure to temperatures in excess of 550° F. for up to 30 minutes when the Celcon plastic bearing ring is consumed in the combustion process. Thus, at least about half of bearing height was through the carbonization of the bearing. The bearings as disclosed herein have also been subjected to a UL 2158 simulation test and it has been found that the nominal component height of the dryer seal bearing was not reduced by any substantial amount even after carbonization caused by the burning the material of the bearing. In some embodiments, the bearings as disclosed herein can actually grow in height after being carbonized by burning. Further, testing using extended exposure to continuous propane flame source have to fully carbonize or to destroy or significantly damage the size, shape or supporting structure of the fibers that comprise a silicon or silicon compound.

Such bearings that can withstand burning as disclosed herein that can withstand exposure to extreme heat and flame can comprise a nonwoven material comprising fibers that comprise silicon (Si) or silicon compounds and a glass reinforced plastic (GRP) scrim. In some embodiments, a bearing for a front dryer seal has been developed as disclosed herein which can comprise a needlepunched nonwoven comprising wool fibers, PET fibers, silicon (Si)-containing fibers, and binder fibers that are blended together with a glass reinforced plastic ("GRP") scrim therein. Such a wool/PET/Si/binder fiber blend batts incorporating a GRP scrim creates a thermally stable and structurally stable bearing material when compared to the conventional material used for bearings for front dryer seals.

The blend of wool fibers, PET fibers, silicon (Si)-containing fibers, and binder fibers can vary and can depend on the expected temperature ranges and the duration time at high temperatures that are expected and the composition of the fibers. For example, the Si-containing fiber, such as silica fibers, can be used to provide added heat protection. For example, the silica fibers can be sodium silicate fibers or staple fibers based on silicic acid anhydrides sold under the trademark BelCoTex®. Various blends can be produced, for example, nonwoven batts using about 15% silica fibers in some embodiments, about 30% silica fibers in some embodiments, and about 50% silica fibers in some embodiments depending on the optimum performance and commercial product. The bearings of the dryer seals that are provided herein are descried in more detail below.

Figure 2:
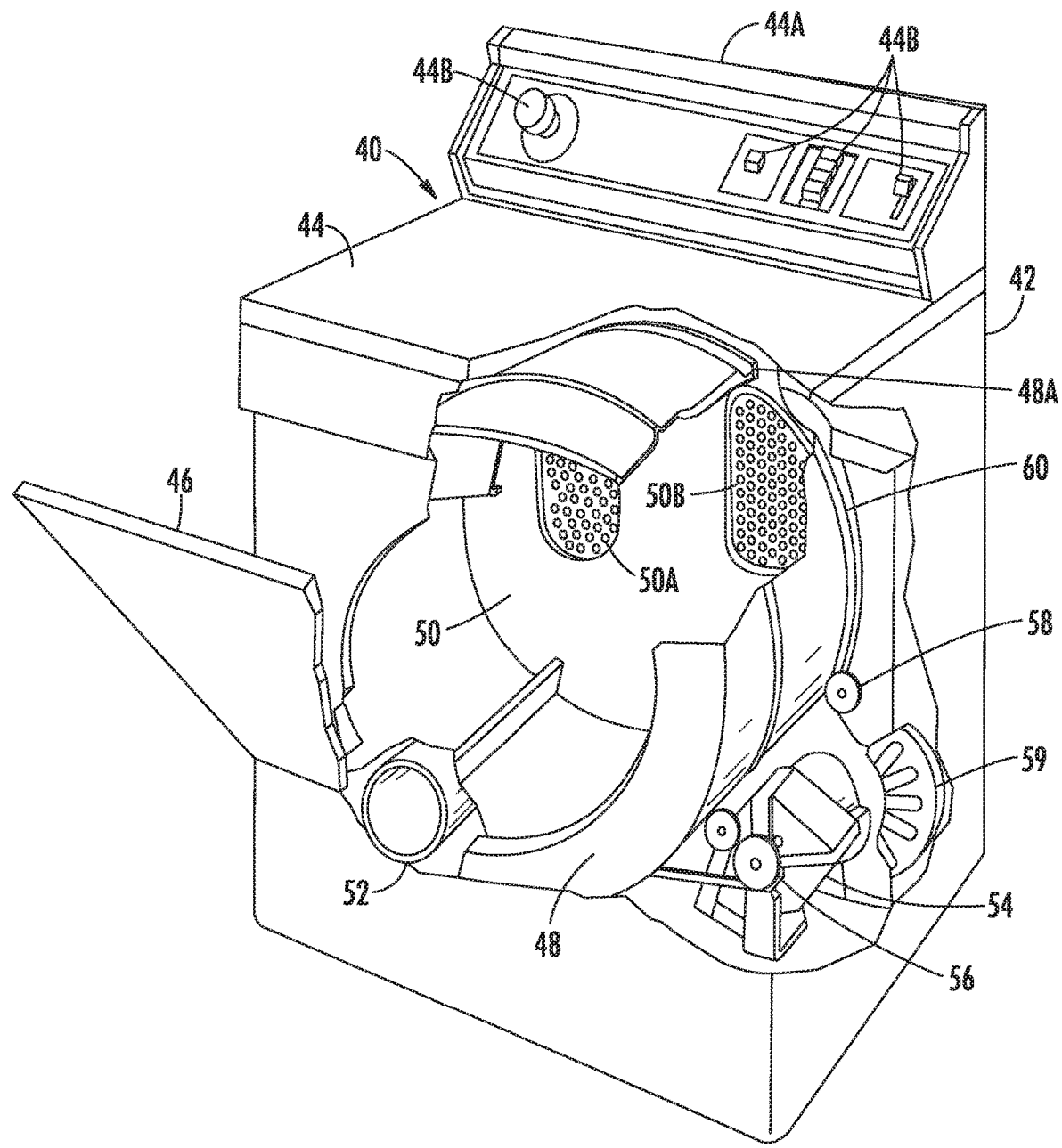
FIG. 2 illustrates a perspective view of another embodiment of a clothes dryer with the rotating drum that uses an embodiment of a seal according to the present subject matter.

Referring now to FIGS. 1 and 2, example embodiments of a domestic clothes dryer are provided that illustrate the general placement and location of dryer seals according to the present disclosure in relation to ether components of the respective dryers. In FIG. 1, an embodiment of a dryer 10 comprising a cabinet body 12 housing a heated rotating drum 14 is provided. As illustrated, cabinet body 12 can comprise a top panel 16 with a control console 16A. The cabinet body 12 can also comprise a front bulkhead 18 (shown in dotted lines) that can include a door opening 18A for loading clothing articles into a mouth 14A of the drum 14. The door opening 18A may be closed by means of a door 20. The front bulkhead 16 of the cabinet body 12 typically can include a front bulkhead flange 22 (shown schematically as the outer front circular dotted line) surrounding the door opening 18 and projecting into the interior of the cabinet body. In such an embodiment, the front bulkhead flange 22 can be disposed generally around a reduced diameter drum opening. Similarly, cabinet body 12 can comprise a rear bulkhead 24 (shown in dotted lines) that can have a rear bulkhead flange (not shown in FIG. 1) projecting into the interior of the cabinet body and can also be disposed generally around a reduced diameter drum opening.

As shown in FIG. 1, a front seal 30A according to the disclosure herein (shown in dotted circular lines and generally interior to the bulkhead flange 22) can be disposed between the front bulkhead flange 22 of the front bulkhead 18 and a front edge outer wall portion of the drum 14. The front seal 30A can be a static seal that comprises a seal body (not numbered) and a bearing block, or bearing, 32A that supports the drum 14 and holds front seal 30A in place. Similarly, a rear seal 30B according to the disclosure herein (shown in dotted circular lines) can be disposed between the rear bulkhead flange of the rear bulkhead 24 and a rear edge outer wall portion of the drum 14. Since dryers are typically vacuum systems, the seals 30A, 30B in operation can prevent or at least reduce the draw of cool (non-heated) air from around the drum 14. With this flow path blocked, air is drawn more efficiently into the drum 14 from a heated element area for use and eventual vent discharge. Additionally the seals 30A, 30B can comprise a structure that includes an outer surface that can provide a reduced frictional engagement between the bulkheads 18, 24 and the drum 14. Further, the seals 30A, 30B can comprise a structure such as a heat-resistant coating that provides fire retardant properties to the aid in containment if a fire was to ignite in the drum 14. For example, seals 30A, 30B can comprise a coating over at least a portion of the respective seal 30A, 30B that provides or enhances the respective seal's fire retardant and/or fire resistant properties as explained in more detail below.

Referring to FIG. 2, a partial cross-sectional view of a different embodiment of a clothes dryer 40 is provided that better illustrates an example interior of a clothes dryer. FIG. 2 refers to one type of air flow configuration, an in and out in the rear bulkhead. This is not meant to exclude other air flow paths such as an axial flow where air is either forced or vacuum fed across the heater costs or gas burner and travels axially to the front panel/bulkhead and exits the drum through the screen and fan. It should be understood that the dryer seal technologies disclosed herein can be used in a variety of different dryer configurations.

Dryer 40 can comprise a cabinet body 42 with a top panel 44 having a control console 44A along a rear portion thereof incorporating a plurality of controls 44B for selecting an automatic series of drying steps. The cabinet body 42 can have a front door 46 providing access to the interior of a horizontally rotatable drying drum 48. The cabinet body 42 can also have a non-rotating rear bulkhead 50 with air inlets 50A and air outlets 50B therein for charging the interior of the drum 48 with heated air from a heater 52 and for exhausting moisture laden air. In this embodiment of a dryer, an electric motor 54 can be provided to rotate the drum 50 through a pulley arrangement 56 on a plurality of rollers 58. The motor 54 can also drive a fan 59 which provides the air flow through the interior of the drum 48. The rotating drum 48 and the stationary rear bulkhead 50 can have a rear seal 60 extending therebetween. The rear seal 60 can be affixed to a rim 48A of the rotatable drum 48 and can be in frictional engagement with the rotating drum 48 and the stationary rear bulkhead 50. Cabinet body 42 can also comprise a stationary front bulkhead (not shown) with a front seal (not shown) disposed between the front bulkhead and a front rim of the drum 48.

In operation, the rear seal 60 and the front seal (not shown) used in dryer 40 can prevent or at least reduce the draw of ambient air from around the drum 48. Instead, air is drawn more efficiently through heater 52 and into the drum 48 through air inlets 50A before being eventually discharged through outlets 50B. As above, the rear seal 60 and the front seal can comprise a structure that includes an outer surface that can provide a reduced frictional engagement between the rear bulkhead and the drum 48 and between the front bulkhead and the drum 48. Further, the rear seal 60 and the front seal can comprise a structure that provides fire retardant and/or fire resistant properties to aid in containment a fire was to ignite in the drum 48. For example, the rear seal 60 and the front seal can comprise a coating over at least a portion of the respective seal that provides or enhances fire retardant properties of the respective sear as explained in more detail below.

The structure and shape of the seals can be dependent upon the design of the interior of the respective dryer in which the seals are to be used and particularly dependent the designed engagement between the respective bulkheads and the drum used within the dryer. In particular, the drum size, drum opening and rim configuration, the bulkhead shape and configuration can impact the determination of the construction, structure, and shape of the respective seals as well as the materials used therein. Depending on the design of the respective dryer, the seal for use between the front rim of the drum and the front bulkhead and the seal between the rear rim of the drum and the rear bulkhead can comprise the same or different structure. For example, the seals can be T-shaped cross-sectional seals, U-shaped cross-sectional seals, V-shaped cross-sectional seals, block shaped cross-sectional seals, seals having folds or loops and/or combinations thereof. Again, depending on the design of the respective dryer, the dryer seal can have a bearing that makes up a portion of an annular seal. IN particular, a front dryer seal can have a bearing portion to aid in holding the drum of a dryer in alignment along the axis of rotation of the drum and in alignment with the front bulkhead. Further, the seals can comprise different substrate material, different substrate layers and construction principles.

Figure 3C:
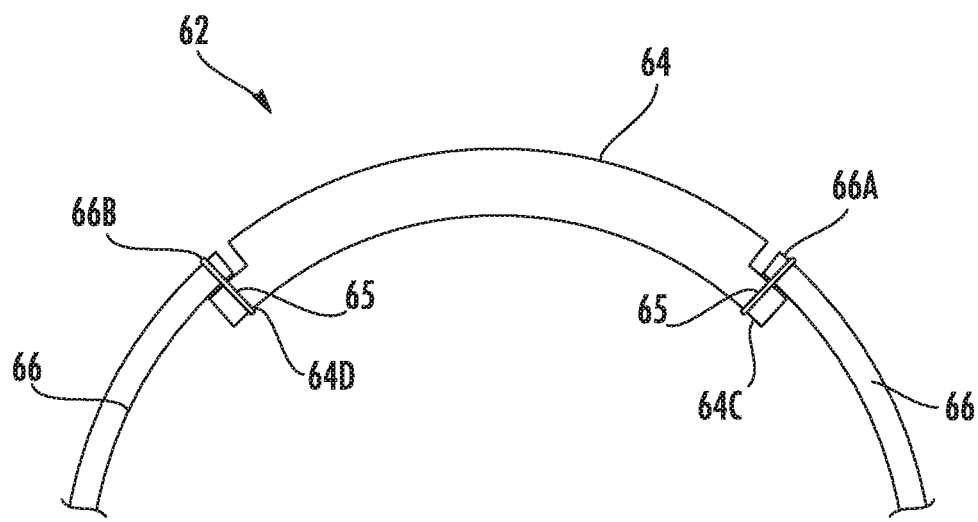
FIG. 3C illustrates a respective schematic front plan view of a portion of the embodiment of the front dryer seal showing attachment of the bearing block to the peripheral seal body according to FIGS. 3A and 3B.
Figures 3A, 3B:
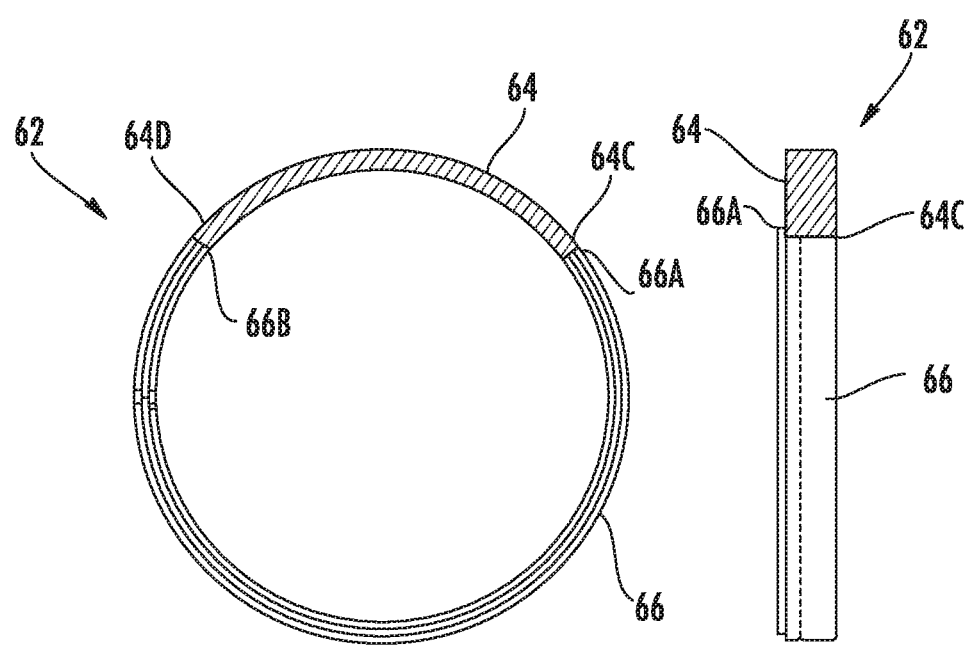
FIGS. 3A-3B illustrate a respective schematic front plan view and side plan view of an embodiment of a front dryer seal according to the present subject matter.

Referring to FIGS. 3A-3C, an example embodiment of a front dryer seal, generally designated 62, is provided. The front dryer seal 62 is annular in shape to fit between a portion of a bulkhead of a dryer and the drum of a dryer to provide a seal that allows the interior of the drum to maintain a desired temperature and pressure when drying clothes. The front dryer seal 62 comprise a bearing support, referred to herein as a bearing, 64 and a seal body 66.

The bearing 64 can comprise a segment of hard felt that creates a bearing surface for locating the seal on an upper position on the front bulkhead. The bearing 64 can hold the dryer seal 62 in position in the dryer so that the drum of the dryer can be aligned with the respective bulkhead and be aligned along the rotational axis of the drum while providing a bearing surface that lowers friction between the bulkhead and the drum. The bearing 64 is usually located at a top portion of the bulkhead and drum and is strong enough to aid in maintaining the drum in position while the drum rotates within the dryer.

The seal body 66 can provide a seal between the bulkhead and the drum of the dryer that allows the interior of the drum to maintain a desired temperature and pressure when drying clothes while permitting low-friction rotation of the drum as well as slight movement or variation in position of the drum relative to the bulkhead. In some embodiments, the seal body, or sealing structure, 66 can comprise one of more elongate flexible substrates. For example, the seal body 66 can comprise a structure similar to those depicted in FIGS. 5A-7C described below or other seal structures as disclosed in U.S. Provisional Patent Application Ser. No. 61/806,944 and U.S. patent application Ser. No. 14/242,855. In some embodiments, the seal body 66 can have a different seal body that those disclosed and described in U.S. Provisional Patent Application Ser. No. 61/806,944 and U.S. patent application Ser. No. 14/242,855.

Referring to FIGS. 3A-3C, the bearing 64 and the substrate of the seal body 66 can be secured together to form an annular shape. The bearing 64 can comprise a first end 64C and a second end 64D. The first end 64C of the bearing 64 can be secured to a first end 66A of the elongate base substrate of the seal body 66. Similarly, the second end 64D of the bearing 64 can be secured to a second end 66B of the substrate of the seal body 66. In this manner, the dryer seal 62 can be formed so that it can assume an annular shape. The ends 64C, 64D of bearing 64 and ends 66A, 66B of the seal body 66 can be secured together in a variety of ways, including, but not limited to, sewing, stitchbonding, heat bonding, adhesive bonding, RF welding, ultrasonic welding, or the like. For example, the ends 64C, 64D of bearing 64 and ends 66A, 66B of the seal body 66 can be secured together by stitching 65 as shown in FIG. 3C. Upon installation in a dryer in some embodiments, for example, the bearing 64 can be positioned on the front bulkhead so as to reside between about 10 o'clock and about 2 o'clock to provide a front bearing support for the rotation of the drum. In some embodiments, the bearing 64 can be typically about 0.400 inches in height. The bearing 64 can locate the drum in the vertical axis and align the drum along its rotational axis. The seal body 66 can form the rest of front dryer drum seal and act as a seal and air flow restriction surface when the dryer is operating.

Referring to FIGS. 4A-4D, embodiments of the bearing 64 is described in more detail. The bearing 64 can be a nonwoven substrate that includes a fiber that comprises fibers with silicon (Si) or silicon compounds therein. For example, the fiber with Si therein can comprise silica fibers that can provide added heat protection. For example, the silica fibers can be sodium silicate fibers or staple fibers based on silicic acid anhydrides sold under the trademark BelCoTex®. Further, in some embodiments, nonwoven of the bearing 64 can comprise a reinforcing scrim that does not deteriorate when exposed to extreme heat and flame to help hold the dry seal and thereby the drum in lace within the dryer even if a dryer fire or smoke explosion occurs within the dryer.

Figure 4A:
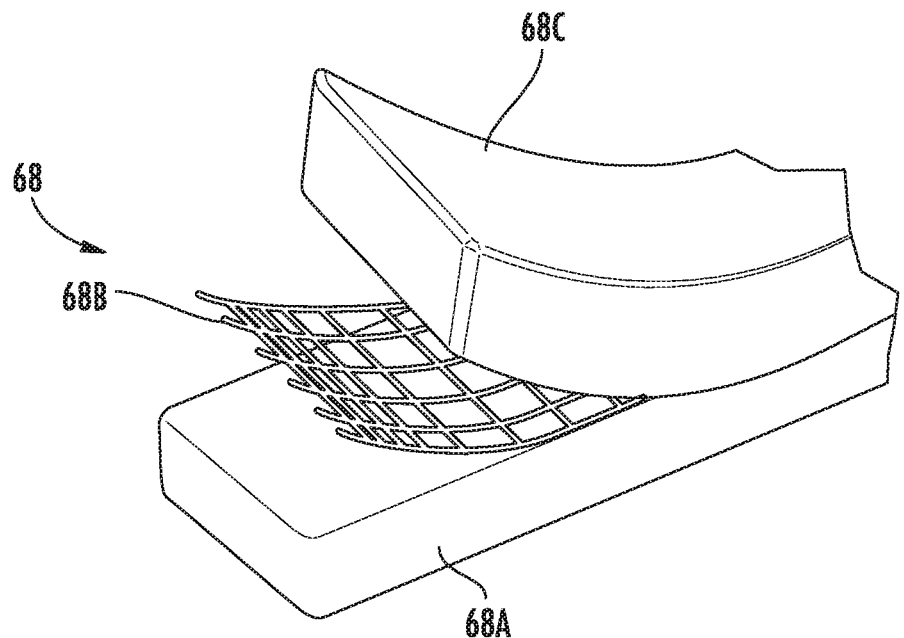
FIG. 4A illustrates a perspective view of an embodiment of a composition of an embodiment of a bearing for use in a dryer seal according to the present subject matter.
Figure 4B:
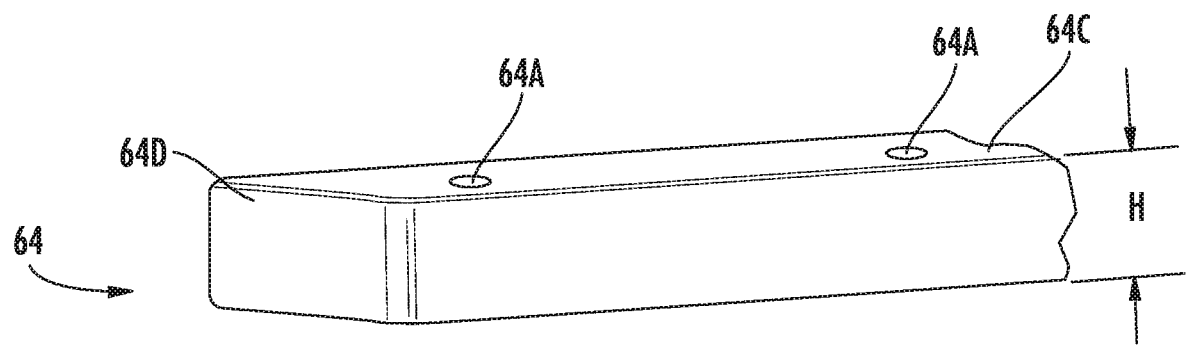
FIG. 4B illustrates a perspective view of an embodiment of a bearing for use in a dryer seal according to the present subject matter.

For example, in some embodiments, the bearing 64 can comprise a needlepunched nonwoven comprising wool fibers, PET fibers, silicon (Si)-containing fibers, and binder fibers that are blended together to form a mat or web that can then be combined with and needlepunched to a glass reinforced plastic ("GRP") scrim. In particular, as shown in FIG. 4A, a composite 68 of layers 68A-68C can be provided that can be needlepunched together to treated to form a bearing 64 as shown in FIG. 4B. Referring to FIG. 4A, one or more mats, batts, or battings, 68A, 68C of blended lubricous fibers, fibers comprising silicon or silicon compounds, and PET fibers can be formed. For example, the batts 68A, 68C can be a blend of wool fibers, fibers comprising silicon or silicon compounds, and PET fibers. In some embodiments, the batts 68A, 68C can comprise a blend of wool fibers, fibers comprising silicon or silicon compounds, PET fibers, and binder fibers. The fibers can be blended in a conventional fashion and then tacked to form the batts 68A, 68C. A reinforced scrim 68B can be laid atop the first batt 68A. Such reinforced scrims can add integrity and stability to the bearing being made. The reinforced scrim 68B can be a GRP scrim. A second batt 68C can then be placed over the reinforced scrim 68B the layered composite 68 can then be processed through a needlepunch machine to bind the layers together to form a needlepunched nonwoven that can then be processed through a heating process, such as processing through heated calender rolls to set the binder fibers to further stabilize the nonwoven. Such a processed nonwoven can provide a thermally stable and structurally stable bearing material for a dryer seal that can withstand exposure to extreme heat and flames. As shown in FIG. 4B, the needled nonwoven can then be processed to form a bearing 64 that can have attachment apertures 64A formed therein to permit the bearing to be secured to a front bulkhead of a dryer using the attachment apertures 64A to provide support for the drum during rotation. As shown in FIG. 4B, the bearing 64 can have a nominal height H that permits it to hold the seal in place within the dryer and to help create a seal between the bulkhead of a dryer and the drum of the dryer.

The composition of the first and second batts 68A, 68C can vary depending on the construction of the dryer in which the bearing and the dryer seal are to be used, the expected temperature ranges to which the bearing may be exposed, and the likelihood of combustion within a drum of a given dryer as well as other possible factors. The presence of fibers that comprise silicon or silicon compounds can increase the amount of heat exposure that the bearing 64 can withstand, while the lubricious fibers, for example, such as wool, can assure a lubricity on the bearing surface that reduces friction and allows the drum of the dryer to rotate easily. The PET fibers can add integrity to the bearing structure 64. PET fibers can vary in melting points. In some embodiments, the PET fibers with different melting points can be used with some of the PET fibers acting as a binder. Binders such as binder fibers, or binder sprays can also be used to improve integrity. For example, in some embodiments, binder fibers, such as bi-component fibers, can be used in the first and second batts 68A, 68C.

Table 1 provided below provides possible ranges for the amount of fibers for the various fibers expected to be used within the first and second batts 68A, 68C. For example, the amount of the fibers that comprise silicon or silicon compounds can vary between about 10% to about 30% of the first and second batts 68A, 68C in some embodiments. In some embodiments, the amount of the fibers that comprise silicon or silicon compounds can vary between about 15% to about 50% of the first and second batts 68A, 68C. In some embodiments the amount of the fibers that comprise silicon or silicon compounds can vary between about 7% to about 15% of the first and second batts 68A, 68C.

TABLE 1

BLENDS OF POSSIBLE FIBERS USED IN A DRYER SEAL BEARING

| Fiber | Fiber comprising Si or Si compound | Thermoplastic Polymer Fiber (can comprise PET) | Lubricious Fiber (can comprise wool) | Binder Fiber |
|---|---|---|---|---|
| Blend % | 7-50% | 30-60% | 30-75% | 0-15% |

The lubricious fibers used in the first and second batts 68A, 68C can vary in amount as well. Such lubricious fibers can usually be wool fibers. For example, in some embodiments, the wool fibers can comprise between about 35% and about 75% of the first and second batts 68A, 68C. In some embodiments, the wool fibers can comprise between about 40% and about 60% of the first and second batts 68A, 68C to assure the lubricity and bearing surface. The presence of wool fibers can be useful in regards to the potential burning of the bearing 64 during a dryer fire. As shown in FIG. 4D, the wool fibers can carbonize which can provide some structural integrity in combination with the silica fibers (or other silicon containing fibers) and the reinforced scrim such that the bearing 64 can minimize the amount that a drum would drop during a drum fire or potential fire.

Similarly, the amount of thermoplastic polymer fibers and the amount of binder fibers in the first and second batts 68A, 68C can vary also. Due to the relative inexpensiveness of polyester, PET fibers can often be used as the thermoplastic polymer fiber, though nylons, polyethylenes, aramids, or other thermoplastic polymer fibers can be used depending on the circumstances. For example, in some embodiments, the range of the amount of PET fibers in the first and second batts 68A, 68C can be from about 30% to about 50%. In some embodiments, the range of the amount of PET fibers in the first and second batts 68A, 68C can be from about 35% to to about 55%. The amount of binder fibers can depend on the type of thermoplastic polymer used and the integrity that is desired. In some embodiments, the amount of binder fibers used in the first and second batts 68A, 68C can range from bout 5% to about 15%. In some embodiments, the amount of binder fibers used in the first and second batts 68A, 68C can range from about 10% to about 15%. In some embodiments, for example, a 10% bi-component (bico) fiber (an example binder fiber) content when combined with a GRP scrim can give superior structural and tensile strength to the current component.

As stated above, the seal body of the dryer seal can also be treated in different manners to better make the seal body fire-retardant. The fire-retardant properties as disclosed herein can still be imparted to most any configuration of dryer seals with the varying of the application and positioning of such properties when taking into consideration the friction reducing and sealing design requirements of the respective seal. Example embodiments of methods of manufacture and seal body configurations or structures are provided below as illustrative of the concepts of the dryer seals subject matter disclosed herein that can be used in combination with the bearings described above.

Figure 5A:
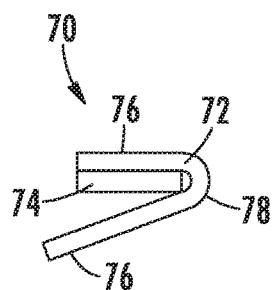
FIG. 5A illustrates a schematic cross-sectional view of an embodiment of a dryer seal without or prior to application of an embodiment of a high temperature, fire retardant coating according to the present subject matter.

FIGS. 5A-7C illustrate different example embodiments of dryer seals that can comprise fire retardant properties and their use within a dryer. Referring to FIGS. 5A-5C, an embodiment of a dryer seal, generally designated 70, is provided that can be folded to form a form a U-shaped seal. The dryer seal 70 can comprise a first base substrate 72. The first base substrate 72 can comprise a textile material such as a woven, nonwoven, and/or a knit as well as, in some embodiments, an extruded layer such as a film. For example, the first base substrate 72 can be a nonwoven substrate that includes a blend of low-melt polymer fibers and high-melt polymer fibers. For example, in some embodiments, the first base substrate 72 can comprise a needlepunched nonwoven fabric that can comprise a blend that can be between about 20% and about 80% low-melt polymer fibers and between about 80% and about 20% high-melt polymer fibers. In some embodiments, the first base substrate 72 can comprise a needlepunched nonwoven fabric that can compose 100% HDPE fiber content. A second base substrate 74 can be secured to a portion of the first base substrate 72. The second base substrate 74 can comprise a textile material, such as a woven, nonwoven, and/or a knit as well. The first base substrate 72 and the second base substrate 74 can be secured together in different manners including, but not limited to, sewing, stitchbonding, heat bonding, adhesive bonding, RF welding, ultrasonic welding, or the like.

Figure 5B:
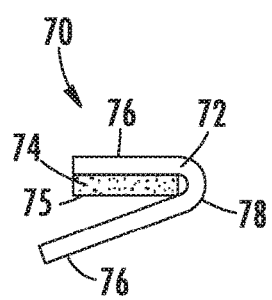
FIG. 5B illustrates a schematic cross-sectional view of the embodiment of a dryer seal according to FIG. 5A with an embodiment of a high temperature, fire retardant coating thereon according to the present subject matter.

When configured for installation within a dryer, the dryer seal 70 can be folded along fold 78 to form legs 76 that position the second base substrate within an interior position. As shown in FIG. 5B, a heat resistant coating 75 can be applied over one or more surfaces of the second base substrate 74 that can include inorganic particles and/or additives within a binder material that can provide fire retardant properties. The inorganic particles can comprise a mineral base material that can include, but are not limited to, vermiculite, mica, clay materials, calcium carbonate and the like or a mixture thereof. The additives in the binder material can include but are not limited to intumescent substances. Once coated, the fibers within the coated substrate are protected from the heat and flame, remaining structurally sound during a fire event.

Figure 5C:
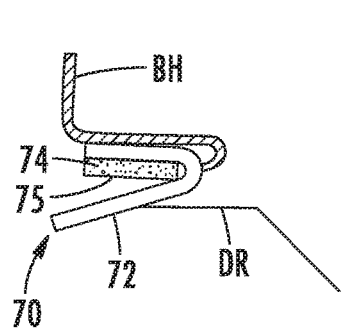
FIG. 5C illustrates a schematic cross-sectional view of the embodiment of the fire retardant dryer seal according to FIGS. 5A and 5B disposed within an embodiment of a clothes dryer according to the present subject matter.

As shown in FIG. 5C, the dryer seal 70 can be secured between a bulkhead BH and a rim DR of a drum so that the legs 76 are positioned between the coated second base substrate 74 and the bulkhead BH as well as the rim DR of the drum. The dryer seal 70 can be attached to the bulkhead BH with the first base substrate 72 frictionally contacting the rim DR of the drum. The first base substrate 72 and the second base substrate 74 can be elongate substrate strips that can be joined together at their ends to form a circular configuration. In some embodiments the dryer seal 70 can be used as a front seal as shown in FIG. 5C.

Figure 6A:
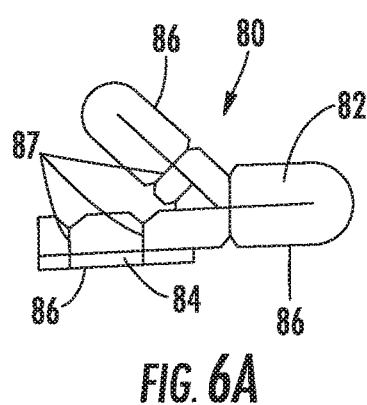
FIG. 6A illustrates a schematic cross-sectional view of another embodiment of a dryer seal without or prior to application of an embodiment of a high temperature, fire retardant coating according to the present subject matter.
Figure 6B:
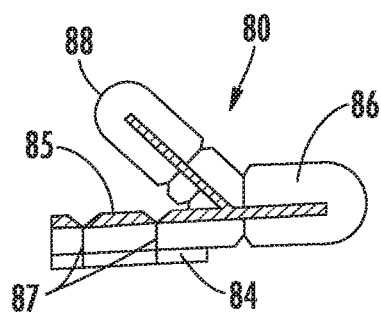
FIG. 6B illustrates a schematic cross-sectional view of the embodiment of a dryer seal according to FIG. 6A with an embodiment of a high temperature, fire retardant coating thereon according to the present subject matter.
Figure 6C:
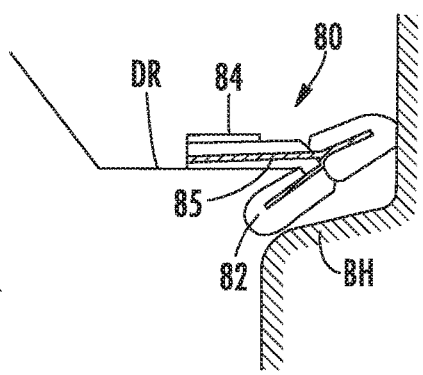
FIG. 6C illustrates a schematic cross-sectional view of the embodiment of a fire retardant dryer seal according to FIGS. 6A and 6B disposed within an embodiment of a clothes dryer according to the present subject matter.

Referring to FIGS. 6A-6C, another example embodiment of a dryer seal, generally designated 80, is provided that can form a form a Y-shaped seal. The dryer seal 80 can comprise a first base substrate 82. The first base substrate 82 can comprise a textile material, such as a woven, nonwoven and/or a knit as well as, in some embodiments, a film. The first base substrate 82 can comprise one or more thermoplastic polymers.

For example, in some embodiments, the first base substrate 82 can comprise one or more low-melt polymers. In some embodiments, the first base substrate 82 can comprise 100% low-melt polymer fibers. In some embodiments, the first base substrate 82 can be a nonwoven substrate that includes a blend of low-melt polymer fibers and high-melt polymer fibers. For example, the first base substrate 82 can comprise a needlepunched nonwoven fabric that can comprise a blend that can be between about 20% and about 80% low-melt polymer fibers and between about 80% and about 20% high-melt polymer fibers. The first base substrate 82 can be folded along folds 88 and stitchbonded with stitching 87 to form three legs 86 in a Y formation. A second base substrate 84 can be stitchbonded to a single layered leg 86 of the first base substrate 82. The other legs 86 can comprise a double layer of the first base substrate 82. The second base substrate 84 can comprise a textile material, such as a woven, nonwoven, and/or a knit as well.

As shown in FIG. 6B, a heat resistant coating 85 can be applied over a first surface of the first base situate 82 that can include inorganic particles and/or additives within a binder material that can provided fire retardant properties. As above, the inorganic particles can comprise a mineral base material that can include, but are not limited to, vermiculite, mica, clay materials, calcium carbonate and the like or a mixture thereof. The additives in the binder material can include but are not limited to intumescent substances. Once coated, the fibers within the coated substrate are protected from the heat and flame, remaining structurally sound during a fire event. Due to the folding and stitching of the first substrate 82, the heat resistant coating 85 can reside between the double layers of the first substrate 82 of the double layered legs 86. The heat resistant coating 85 can also be on the opposite side of the first substrate 82 where the second base substrate 84 is attached to the first substrate 82. In some embodiments, the second base substrate 84 can additionally or alternately have a heat resistant coating 85 thereon. In some embodiments, the second substrate 84 may not be included.

As shown in FIG. 6C, the dryer seal 80 can be secured between a bulkhead BH and a rim DR of a drum so that the double layered legs 86 are positioned between the bulkhead BH and the rim DR of the drum. Additionally, the rim DR can be placed between the single leg 86 with the second base substrate 84 thereon and one of the double layered legs 86. The dryer seal 80 can be attached to the rim DR with at least one of the double layered legs 86 frictionally contacting the bulkhead BH. In some embodiments, the dryer seal 80 can be used as a rear seal as shown in FIG. 6C.

Figure 7A:
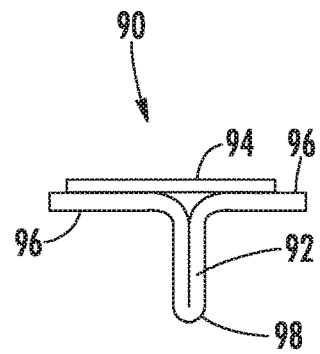
FIG. 7A illustrates a schematic cross-sectional view of further embodiment of a dryer seal without or prior to application of an embodiment of a high temperature, fire retardant coating according to the present subject matter.
Figure 7B:
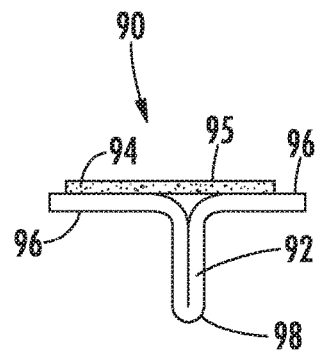
FIG. 7B illustrates a schematic cross-sectional view of the embodiment of a dryer seal according to FIG. 7A with an embodiment of a high temperature, fire retardant coating thereon according to the present subject matter.
Figure 7C:
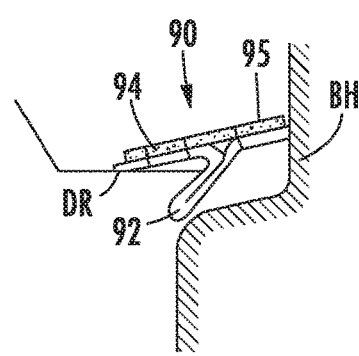
FIG. 7C illustrates a schematic cross-sectional view of the embodiment of a fire retardant dryer seal according to FIGS. 7A and 7B disposed within an embodiment of a clothes dryer according to the present subject matter.

Referring to FIGS. 7A-7C, an embodiment of a dryer seal, generally designated 90, is provided that can be folded to form a form a T-shaped seal. The dryer seal 90 can comprise a first base substrate 92. The first base substrate 92 can comprise a needlepunched nonwoven fabric. For example, the first substrate 92 can comprise a needlepunched nonwoven comprising wool fibers, PET fibers, silicon (Si)-containing fibers, and binder fibers (Bico) that are blended together with a glass reinforced plastic ("GRP") scrim therein to provide a thermally stable, structurally stable bearing material.

A second base substrate 94 can be secured over a fop portion of the first base substrate 92 to form a T-shaped seal with three legs 96. The second base substrate 94 and its securement to the first base substrate 92 can help hold the cross-sectional shape of the seal in the T-shape. As above, the second base substrate 94 can comprise a textile material, such as a woven, nonwoven, and/or a knit as well. In some embodiments, the second base substrate 94 can comprise a woven scrim. For example, the second base substrate 94 can comprise a fiber-glass scrim. In some embodiments, the second base substrate 94 can comprise a nonwoven, such as a needlepunched nonwoven or a point-bonded nonwoven.

The first base substrate 92 and the second base substrate 94 can be secured together in different manners including, but not limited to stitchbonding, heat bonding, adhesive bonding, RF welding, ultrasonic welding, or the like. The first base substrate and the second base substrate 94 can be elongate substrate strips that can be joined together at their ends to form a circular configuration.

In particular, when configured for installation within a dryer, the dryer seal 90 can be folded along fold 98 to form legs 96 that position the second base substrate 94 in an upper exposed position. As shown in FIG. 7B, a heat resistant coating 95 can be applied over one or more surfaces of the second base substrate 94. The heat resistant coating 95 can include inorganic particles and/or additives within a binder material that can provide fire retardant and/or fire resistant properties. As above, the inorganic particles can comprise a mineral base material that can include, but are not limited to, vermiculite, mica, clay materials, calcium carbonate and the like or a mixture thereof. The additives in the binder material can include but are not limited to intumescent substances. Once coated, the coated substrate of the dryer seal can provide protection outside of a dryer that the seal is on from excessive heat and flame that occur within a drum when a fire occurs therein. The coating can also help the dry seal remain structurally sound during a fire event. The dryer seal 90 can be secured to a rim DR of a drum of a dryer so that at least a portion of the dryer seal 90 resides between a bulkhead BH and the rim DR of the drum as shown in FIG. 7C. The first substrate without the coating can contact the bulkhead BH as the drum and seal 90 rotate in the dryer. In some embodiments, the dryer seal 90 can be used as a rear seal as shown in FIG. 7C.

Thus, according to the subject matter disclosed herein, coated fabrics that can comprise at least a portion of a dryer seal may be used alone. Alternatively, the coated can be laminated, stitched, bonded, or otherwise attached to uncoated materials to produce specific mechanical properties such as strength, wear durability, elasticity, frictional coefficients, air flow, lubricity, bearing surface, axial bearing surface, etc. As stated above and explain in more detail below, the coating can include an intumescent substance and/or a mineral based material. The mineral based material can include but is not limited to vermiculite, mica, clay materials, calcium carbonate and the like or a mixture thereof. Vermiculite is generally known as a hydrated laminar magnesium-aluminum-iron silicate. Due to its crystalline structure, vermiculite expands with the application of heat. The expansion known as exfoliation is the result of the mechanical separation of layers of the vermiculite by the rapid conversion of the contained water into steam. The exfoliated material can then be combined with some form of chemical binder material which can in some instances include, but is not limited to a latex or silicon material. The binder can also comprise intumescent technology whereby the coating will swell and form a multi layered char form when exposed to heat. High carbon char is extremely heat resistant and is widely used in rocket and jet pipe technology. In some embodiments, the binders that comprise one or more intumescent substances can be used with or without a mineral based material. The mineral based material and/or the intumescent substances can, in some embodiments, include nanoparticles and/or microparticles.

The coated fabrics can then be included in a seal to fit the specific drum and bulkhead interface criteria. The seal formation can be accomplished in many ways including sewing, heat bonding, ultrasonic welding, RF welding, etc.

Figure 8:
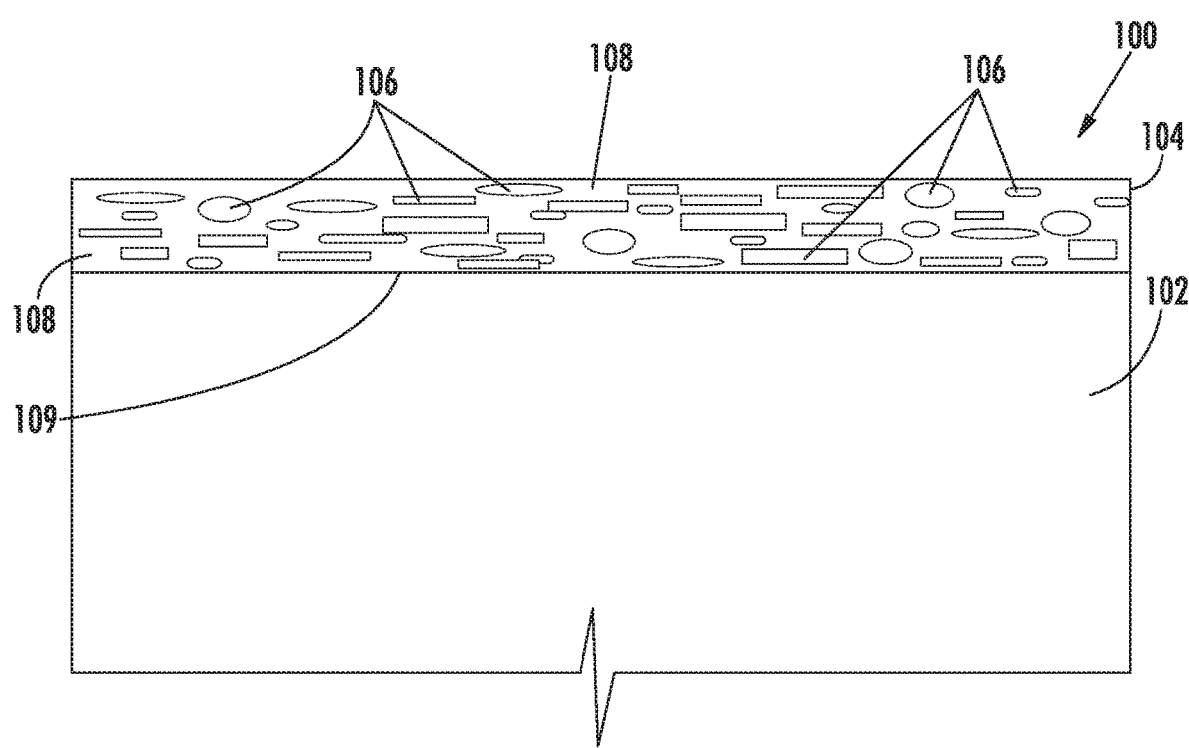
FIG. 8 illustrates a schematic cross-sectional view of a portion of an embodiment of a dryer seal including the heat resistant or fire retardant coating according to the present subject matter.

As shown in FIG. 8, a portion of a the fire retardant dryer seal generally designated 100, that schematically illustrates a heat resistant coating 104 thereon. Dryer seal 100 can comprise a base substrate 102 that can comprise one or more layers of textile material that can include, but is not limited to nonwoven material, woven material, knitted material, film material or combinations thereof. For example, the base substrate 102 can comprise a nonwoven fabric that can be stitchbonded, heat bonded for example through point bonding. Alternatively, the base substrate can be bonded through ultrasonic welding, RF welding, or like.

The dryer seal 100 can have the heat resistant coating 104 disposed on the substrate 102. In the embodiments shown, the heat resistant coating 104 can generally include particles 106 expensed within a film-forming binder 108. In some embodiments (not shown), a heat resistant coating 104 can comprise an intumescent substance without the inclusion of particles 106.

In some embodiments, the particles 106 can comprise an inorganic mineral. The inorganic mineral particles 106 can generally serve, collectively, to deflect and/or absorb heat energy applied to the coating so that the underlying fabric layer(s) of the base substrate 102 and/or the surrounding environment outside the drum on which the dryer seal 100 is secured are substantially protected. In particular, the inorganic material can be a higher heat capacity that can absorb the heat from a fire in and around the drum and insulate and deflect the heat so that the temperature on the other side of the coating 104 from the side exposed to the fire or extreme heat is much lower. For example, if the coating 104 is exposed directly to the heat and flames of a fire within a drum of a dryer, the temperature on the side of the base substrate 102 that is opposite of the side on which the coating resides is much lower. As stated above, the inorganic mineral material forming the particles 106 can include, but is not limited to, vermiculite, mica, clay materials, calcium carbonate and the like, or a mixture thereof.

In one particular embodiment, vermiculite can be included (either alone or in combination with another inorganic mineral material) in the heat recant coating 104. Vermiculite is, as is generally known in the art, a hydrated laminar magnesium-aluminum-iron silicate, which resembles mica in appearance, as both contain silicate sheets. Due to its crystal structure, vermiculite expands with the application of heat. The expansion, known as exfoliation, is the result of the mechanical separation of the layers within vermiculite by the rapid conversion of contained water to steam. Without wishing to be bound by any particular theory, it is believed that this expansion mechanism serves to absorb a large portion of the heat applied to the coating, resulting in the underlying fabric or the environment on the opposite side of the expanded coating from the fire or extreme heat being sufficiently protected from that heat. Thus, the resulting coating fabric is particularly suitable for enduring the quick exposure to heat, for example, from a flash fire within a dryer, to protect the underlying fabric or the environment on the opposite side of the expanded coating from the fire and its heat.

Prior to preparing the heat resistant coating, the inorganic mineral material (e.g., vermiculite) can be chemically exfoliated and/or granulated to form delaminated platelets. Any method of granulation can be used to obtain the desired size. As particles, the inorganic material can be dispersed within a suitable solvent system. The solvent system generally includes at least one solvent that is configured to disperse the inorganic particles in a substantially homogeneous manner (particularly upon mixing) so that a substantially uniform coating can be formed therefrom. In one embodiment, the solvent system can include water, an alcohol (e.g., methanol, ethanol, propanol, etc.), an organic solvent, or mixtures thereof.

In one particular embodiment, the inorganic particles 106 may, generally, have a plate-like shape in that each particle's thickness is less than the width and/or length. This particular shape of the particles 106 can be formed via granulation and/or exfoliation as discussed above. For instance, each particle 106 can have a thickness that is at least about 10 times less than the largest dimension of the particle. For example, the particles 106 can have an aspect ratio (width/length: thickness) of between about 500:1 to about 1000:1.

For example, the particles 107 may have an average thickness of less than about 50 nm, such as about 0.1 nm to about 50 nm when exfoliated. Alternatively, the particles 106 may have a larger dimension of about 0.5 μm to about 50 μm. For instance, the particles 10 may have a diameter or a greater dimension (in length or width) in the range of from about 10 μm to about 40 μm. As such, in certain embodiments, the particles 106 may have an average, thickness of about 0.5 nm to about 10 nm, and may have a larger dimension of about 10 μm to about 40 μm (e.g., width and/or length). In one particular embodiment, the particles 106 can have an average size of about 1 nm to about 2 nm in its thickness while having an average diameter or larger dimension in width or length of about 20 μm to about 40 μm.

Such a relatively small particle size can allow for a relatively large surface area of the mineral material for absorbing and/or dispersing heat applied thereto. Additionally, the use of such relatively small particles allows the coating to remain flexible.

The film-forming binder 108 generally serves to adhere and hold the particles 106 in place within the heat resistant coating 104 on the base substrate 102. Thermal set or thermoplastic binders can be utilized to facilitate the coating process. Such binder materials include, but are not limited to, acrylic resins, styrene-butadiene rubber (SBR) polyvinyl alcohol ethyl vinyl acetate resins, phenolic resins, etc., and combinations thereof. Additionally, other types of substances can be included in the binder 108.

A binder 108 can adhere to a portion of the dryer seal 100 to provide heat resistance, fire retardancy, and/or fire resistance to the dryer seal 100 while the dryer seal 100 still provides friction reduction and/or sealing capabilities. Regarding its fire resistance capabilities, the binder 108 can be formulated to include certain desired properties. Such properties, for example, can include, but are not limited to, having a low flame spread; having low smoke toxicity; providing thermal insulation protection; providing long term promotion from heat and flame; having a low smoke production; easy application; good wear resistance; adherence to the desired base substrate; and the appropriate flexibility after application to permit the dryer seal to perform its intended functions.

In some embodiments, binder 108 can comprise an intumescent coating which can fulfill many of these properties. An intumescent is a substance that swells as a result of heat exposure, thus increasing in volume and decreasing in density. The term intumescent when applied to fire protective coatings refers to a technology wherein the coating will swell and form multi-layered char foam when exposed to heat. High carbon containing chars are extremely heat resistant and can be employed in critical high temperature applications such as the carbon on carbon composites that are machined to produce rocket exhaust nozzles. The production of these carbon on carbon composites involves the combination of graphite fibers with high char yield epoxies. After curing, these parts are graphitized in a high-pressure autoclave at high temperatures. Intumescent materials can be thermally stable to above 1,000° C. (1,832° F.). With the right choice of materials, intumescent coatings can produce a low thermally conductive char foam. Thus, a coating 104 that includes an intumescent substance can form a char foam that has a low thermal conductivity when exposure to fire and/or extreme heat.

Soft char intumescent substances can produce a light char that is a poor conductor of heat, thus retarding heat transfer. Typically, these intumescent substances can also contain a significant amount of hydrates. As the hydrates are spent, water vapor is released, which has a cooling effect. Once the water is spent, the insulation characteristics of the char that remains can slow down heat transfer from the exposed side to the unexposed side of a dryer seal 100 that includes a coating 104. Typically, the expansion pressure that is created for these products is very low, because the soft carbonaceous char has little substance, which is beneficial if the aim is to produce a layer of insulation. Harder char intumescent substances can be produced with sodium silicates and graphite. These intumescent substances can produce a more substantial char capable of exerting quantifiable expansion pressure. For example, in some embodiments, such intumescent substances can be used as at least a portion of the binder 108 and the inorganic particles can comprise a vermiculite material as discussed above in the dryer seal 100.

While not being bound by any particular theory. It is contemplated that if a fire was to ignite in a drum, the heat resistant coating 104 on the dryer seal 100 could expand to effectively restrict the air flow into drum of the clothes dryer between the drum rim and the bulkheads. For example, in some embodiments, the air flow can be restricted to between about 10 cubic feet per minute (cfm) to about 30 cfm. This expansion can have the effect of starving any fire or potential flame so that the combustible material within the drum only smolders and does not ignite into flame and/or stay ignited. Further, the fire can be prevented from propagating through the dryer seal. This effect combined with the insulative qualities of both such a binder 108 and inorganic particles 108 in heat resistant coating 104 can increase the effectiveness of the ability of the dryer seal to facilitate containment of dryer fires within the cabinet body.

For example, the intumescent substances that can be included within the binder 108 when activated by heat to expand, i.e., char, can have a restricted air permeability of between about 15 and about 30 cfm which permits fire inside the drum to be contained, smoldering and slowly consuming the combustible material but not permitting sufficient oxygen to enter the drum and create a more violent and high temperature fire. Tests have been conducted within a drum of clothes dryers and/or apparatuses that simulate the interior chamber of a drum of a clothes dryer that indicate that a combustion event will not exceed a maximum temperature of 800° F. when an intumescent material within a binder 108 on a dryer seal is activated. Without the intumescent, the temperatures within the drum of clothes dryers and/or apparatuses that simulate the interior chamber of a drum of a clothes dryer can reach and exceed 1,250° F.

In particular for some embodiments of the heat resistant coatings 104 in which the binders 108 comprise an embodiment of one or more intumescent substances, the chemistry of char formation can provide a classic dehydration reaction between hydroxyls, carboxylic acids and amines or amine groups to form polymeric linkages. The dehydration reaction requires heat and can be enhanced by an acid catalyst. Water and ammonia can be liberated during these reactions. Some such substances can contain oxygen or nitrogen on every carbon and have a natural propensity for char formation. Examples can include starches and sugars, intumescent substances can comprise amino phosphates or amino sulfonates that, upon heating can liberate phosphoric or sulfonic acid to catalyze the dehydration reaction and ammonium ions to facilitate char formation. In some embodiments, polymeric substances without an aliphatic carbon chain can be used as at least a portion of such binders intumescent materials that have more nitrogen and oxygen on the hydrocarbon chains can be more desirable.

Commercial examples of an intumescent substance that are available include INTUMAX manufactured by Broadview Technologies, Inc. located in Newark, N.J. Such intumescent agents can allow the use of less intumescent agent in a binder's formulation, which, in turn, can improve the physical and adhesive properties of the coatings. Many others sources of intumescent substances that can be added to binder materials are available.

To formulate intumescent coatings several additional chemistry considerations can be considered. For example, higher amounts of oxygen and nitrogen on carbon can make it easier to produce a char. In addition, the more double bonds the less heat will be released during the initial burning stage. Also, the temperatures at which dehydration and de-hydrogenation reactions occur vary for different polymers. The choice of an intumescent substance can affect the release of acid catalyst, oxygen addition catalyst and recombinant ammonium ions. In some embodiments, the intumescent substance used can release acid catalyst, oxygen addition catalyst and recombinant ammonium ions close in time to or simultaneously with the dehydrogenation and dehydration reactions.

Other considerations involve the melt flow rheology, the char height and char strength. There are also the conventional formulation considerations having to do with everything from thixotropic behavior to flexibility and everything in between. The formulation of the binder 108 that include one or more intumescent substances can be such that the formulation can help char properties not hurt them. For example, since char layers remain on the surface, wetting agents and defoamers that reduce surface tension may want to be avoided. Certain fillers can have synergistic benefits. The particles 106 can comprise ceramic and phenolic micro spheres that can add to the thermal insulative properties. Intumescent substances can be added to binder materials such as, but not limited to, acrylic resins, styrene-butadiene rubber (SBR), polyvinyl alcohol, ethyl vinyl acetate resins, phenolic resins, etc., and combinations thereof.

These binder materials can be modified as desired to crosslink (e.g., with a crosslinking agent, such as melamine formaldehyde) or to change other characteristics such as hydrophobicity, hydrophilicity, viscosity, pH, etc. As such, other materials and components can be included within the heat resistant coating 104. For example, waxes, plasticizers, rheology modifiers, antioxidants, antistats, antiblocking agents, and other additives may be included as desired. Surfactants may be added to help disperse some of the ingredients, especially the film-forming binder within the solvent system. When present, a surfactant(s) can be included in the heat resistant coating up to about 20%, such as from about 0.5% to about 5%. Exemplary surfactants can include nonionic surfactants and/or ionic surfactants.

A plasticizer may also be included in the heat resistant coating 104. A plasticizer is an additive that generally increases the flexibility of the final coating by lowering the glass transition temperature for the binder (and thus making it softer). In one embodiment, the plasticizer can be present in the heat resistant coating 104 up to about 25%, such as from about 5% to about 20%, by weight. Likewise, viscosity modifiers can be present in the heat resistant coating. Viscosity modifiers are useful to control the rheology of the coatings in their application. A particularly suitable viscosity modifier is high molecular weight poly(ethylene oxide). The viscosity modifier can be included in any amount to help the coating process, such as up to about 5% by weight, such as about 0.5% to about 3% by weight.

To form the fire retardant portion of the dryer seal 100, the particles 106 of inorganic material can be combined with the film-forming binder 108 to form a coating/paste, which can then be wet-laid onto a surface 109 of the base substrate 102 and dried to form the coating 104. For example, the particles 106 can be combined as dry particles or dispersed within a solvent system, as discussed above. After drying, the inorganic material of the particles 106 can constitute about 0.5% by weight to about 99.5% by weight of the total weight of the heat resistant coating 104 (e.g., about 50% by weight to about 95% by weight).

Depending on the level of heat shielding desired for a particular application, the thickness of the heat resistance coating 104 can be varied along with the type of inorganic material included in the particle 106 and/or the concentration of particles 106 in the coating 104. In most embodiments, the thickness of the heat resistant coating 104 can be about 10 µm to about 1 mm (e.g., about 10 µm to about 100 µm).

In some embodiments, a single application of the heat resistant coating 104 on the base substrate 102 may be sufficient. However, multiple applications are available and can be applied using the method described above. Thus, the presently described dryer seal 100 is not limited to a single layer of the heat resistant coating 104 on a substrate 102 of the dryer seal 100.

FIGS. 9A-9D illustrate one specific embodiment of a dryer seal, generally designated 110, that includes a bearing 114 and a seal body 112 comprising a folded over elongate exterior base substrate 116 and one or more elongate interior base substrates 118. The dryer seal 110 can have a substantially circular construction. For example, the bearing 114 can comprise a first end 114A and a second end 114B. The first end 114A of the bearing 114 can be secured to a first end 112A of the elongate base substrate of the seal body 112. Similarly, the second end 114B of the bearing 114 can be secured to a second end 112B of the substrate of the seal body 112. The ends 114A, 114B of bearing 114 and ends 112A, 112B of the seat body 112 can be secured together in a variety of ways, including, but not limited to, sewing, stitchbonding, heat bonding, adhesive bonding, RF welding, ultrasonic welding, or the like.

The bearing 114 of the dryer seal 110 can comprise a needlepunched nonwoven comprising a reinforced scrim and fibers with silicon therein, such as silica fibers or other fibers with silicon compounds therein. Further, in some embodiments, the bearing 114 of the dryer seal 110 can also comprise at least one of wool fibers, PET fibers, or binder fibers that are blended together with fibers with silicon therein and a glass reinforced plastic ("GRP") scrim embedded therein and needlepunched and heat set to provide a thermally stable and structurally stable bearing material.

According to some embodiments, the sealing body 112 can be formed by folding an interior base substrate 118 and then by folding an outer base substrate 116 around the folded interior base substrate 118 and applying a securement line 120 through the layered structure 112 to secure the components in place relative to one another. As illustrated, the stitch line 120 can be disposed at an inboard location relative to the folded over edge of the outer layer 116. Such an arrangement thereby forms a single bulbous pocket structure 124 in which a proximal end 122 of the fold of the interior base substrate 118 is held.

In some embodiments, one or more separate interior base substrates 118 can be inserted into a pocket formed by a folded outer base substrate 116. In some embodiments, one or more of the separate interior base substrates 118 can be folded. In such embodiments, the other separate interior base substrates 118 can be unfolded. In some embodiments, all of the one or more interior substrates 118 can be unfolded. In some embodiments the outer base substrate 116 can comprise two outer base substrates 116 secured together along one side to form an elongate pocket in which one or more interior base substrates 118 can be inserted and secured therein.

The outer base substrate 116 can comprise a textile material such as a woven, nonwoven, and/or a knit as well as, in some embodiments, a film. According to some embodiments, the outer base substrate 116 can be a needle punched nonwoven textile material formed from entangled fibers of wool, polyester, other synthetic fiber, or blends thereof. In one exemplary construction the outer base substrate 116 is a needle punched grey wool felt or wool/ polyester blend felt having a thickness of about 0.13 inches. However, it is likewise contemplated that other materials, sizes, and/or constructions may be utilized if desired.

The interior base substrate 118 can also comprise a textile material, such as a woven, nonwoven, and/or a knit as well as, in some embodiments, a film. According to some embodiments, the interior base substrate 118 can be a needle punched nonwoven textile material. In some embodiments, the interior base substrate 118 can comprise a point-bonded nonwoven sheet. For example, the substrate 118 can comprise polyester or other synthetic fibers. In some embodiments, this interior base substrate 118 can be needle punched polyester having a thickness of about 0.17 inches and a mass per unit area of about 12 ounces per square yard. However, it is likewise contemplated that other materials, sizes, and/or constructions may be utilized if desired.

The securement line 120 which defines the inboard boundary of the pocket 124 can be formed by heat bonding, adhesive bonding, ultrasonic welding, RF welding, stitching, such as a chain stitch or lock stitch construction, or the like. In one example construction, the securement line 120 comprises a stitch line that can incorporate a stitch density of about 5 to about 13 stitches per inch. However, it is likewise contemplated that other stitching arrangements and/or welding or bonding arrangements may be utilized if desired. The stitch joints formed can exceed the tear strength of the fled, or other type of base substrate 116.

As shown in FIG. 9C, outer base substrate 116 can have interior surfaces 116A and 116B and folded interior base substrate 118 can comprise an inner surface and an outer surface. The inner surface of interior base substrate 118 can have a heat resistant coating 118I thereon, and the outer surface of the interior base substrate 118 can also have a heat resistant coating 118O thereon. The heat resistant coating 118I, 118O can be fire retardant and/or fire resistance. Heat resistant coatings 118I and 118O can and can include inorganic particles dispersed within a binder material as described above. Because the interior base substrate is folded, there can be effectively two inner layers of heat resistant coating 118I and two outer layers of heat resistant coatings 118O. Thus, in such embodiments, four layers of heat resistant coatings can reside between the interior surfaces 116A, 116B of the outer base substrate 116. Due to the thinness of the heat resistant coating layers (which are exaggerated in the FIG. 7C), multiple layers of the heat resistant coating should not interfere with the other operational aspects of sealing and friction reduction of the dryer seal 110. Due to the folded substrates, dryer seal 130 can have multiple legs.

Further, additionally or alternatively, at least one of interior surfaces 116A, 116B of the outer base substrate 116 can have a heat resistant coating thereon that is fire retardant and/or fire resistant. In some embossments, the interior base substrate 118 can be unfolded such that two layers of heat resistant coating reside between interior surfaces 116A, 116B of the outer base substrate 116. In some embodiments, a single surface of an unfolded interior base substrate 118 can have a heat resistant coating thereon so that one layer of heat resistant coating resides between interior surfaces 116A, 116B of the outer base substrate 116. Other similar configurations are contemplated.

Figure 9D:
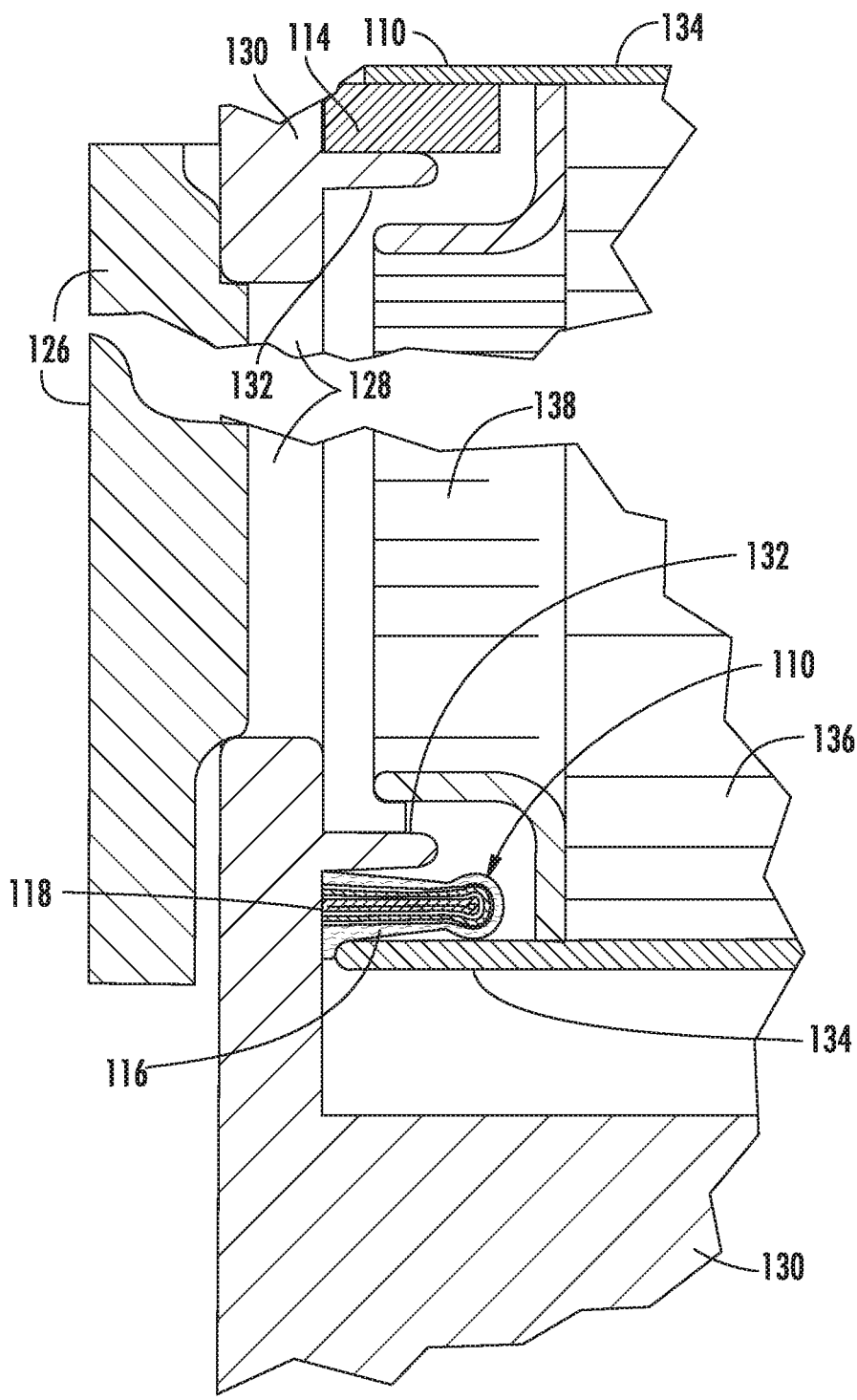
FIG. 9D illustrates a schematic cross-sectional view of the embodiment of the front dryer seal according to FIGS. 9A-9C disposed within an embodiment of a clothes dryer according to the present subject matter.

As shown in FIG. 9D, the dryer seal 110 can be placed in a dryer 130, for example, between a front bulkhead flange 132 and an outer wall portion 134 of a rotatory drum 136. For example, the bearing 114 of the dryer seal 110 can be secured to a top portion of the front bulkhead flange 132 between the front bulkhead flange 132 and the outer wall portion 134 of the rotatory drum 136 with the seal body 112 extending between the rest of the front bulkhead flange 132 and the outer wall portion 134 of the rotatory drum 136. The placement of dryer seal 110 can thus be on an outside perimeter of the mouth 128 in the front bulkhead and the mouth 138 in the drum 136. The mouth 128 at the front bulkhead can be opened and can be sealable closed by a door 126. As the dryer is operated the drum 136 may experience a degree of oscillation up and down. The outer base substrate 116 and the interior base substrate 118 define legs which may flair out or compress as required to adjust for this up and down oscillation and thereby maintain contacting sealing relation with the moving drum 136. If a fire was to ignite in the interior of dryer 130 or the drum 136, the bearing 114 would likely char, but would permit the drum 136 to drop. Further, the heat resistant coatings on the one or more interior surfaces of the outer base substrate 116 and the interior base substrate 118 can provide insulation against the heat and flames of the fire and, in some instances, along with the maintenance of the drum in proper position by the bearing 114, can facilitate the smothering of the fire within the dryer 130.

Figure 10:
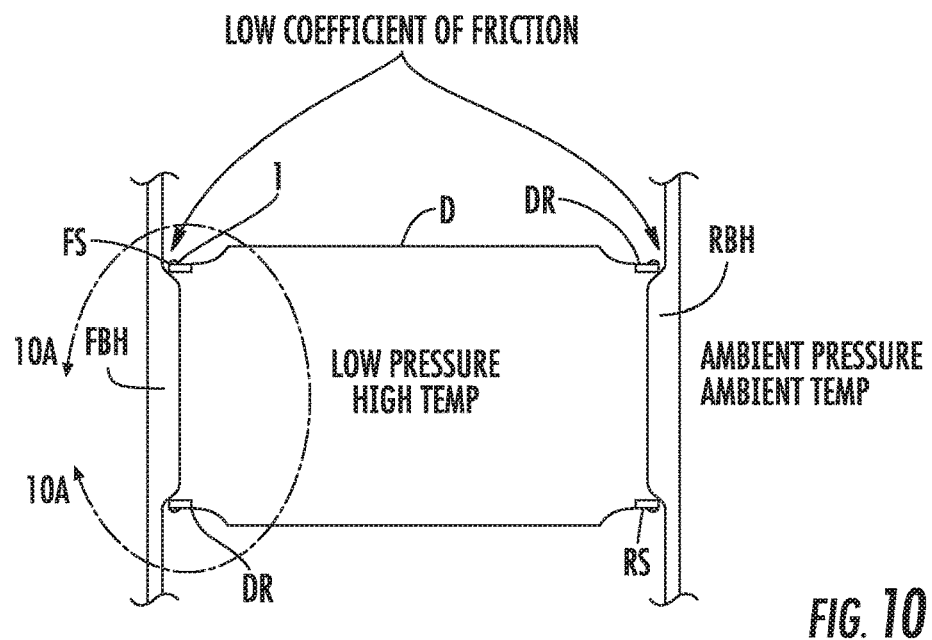
FIG. 10 illustrates a schematic cross-sectional view of a drum portion of a clothes dryer using one or more embodiments of fire retardant dryer seals according to the present subject matter showing the temperature differential across the seals.
Figure 10A:
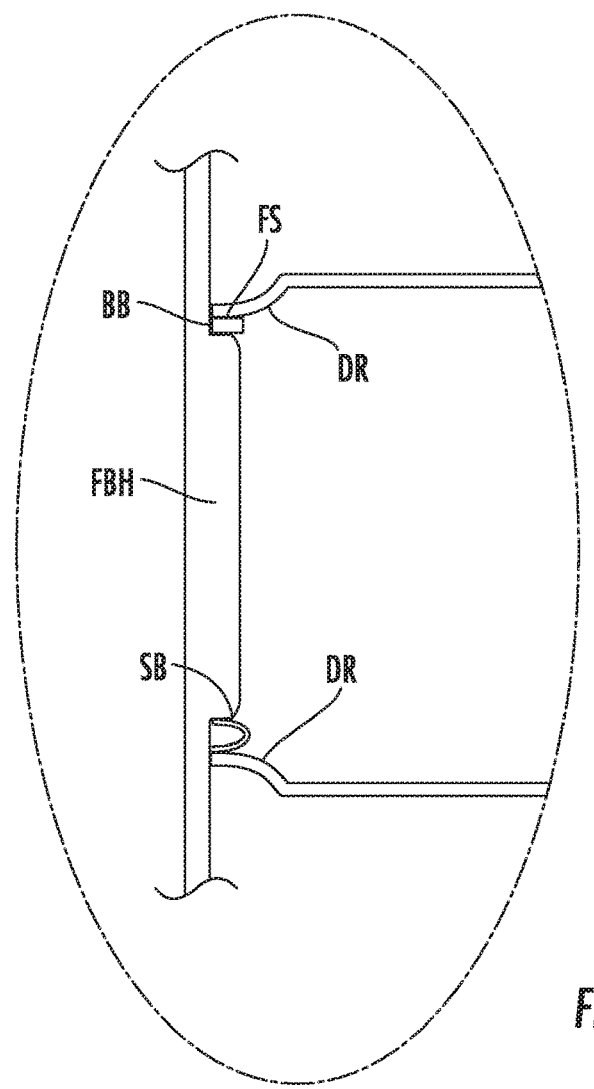
FIG. 10A illustrates an enlarged schematic cross-sectional view of the drum portion of a clothes dryer and the static front fire retardant dryer seal according to section 10A according to FIG. 10.

FIGS. 10 and 10A show schematics of a dryer having a front bulkhead FBH and a rear bulkhead RBH with a drum D placed therebetween. A front dryer seal FS that is treated with a heat resistant coating as described above can be located between the front bulkhead FBH and a front drum rim DR of the drum D. As shown in FIG. 10A, the front dryer seal FS can comprise a static dryer seal that is secured to the front bulkhead FBH and does not rotate with the drum D. The front dryer seal FS can comprise a seal body SB and a bearing, or bearing block, BB, that can be secured to the front bulkhead FBH. Additionally, a rear dryer seal RS that is treated with a heat resistance coating as described above can be located between the rear bulkhead RBH and a rear drum rim DR of the drum D. The rear dryer seal RS can comprise a dynamic dryer seal that is secured to the drum D and rotates with the drum D. For example, the dryer seals FS and RS can be attached to the bulkheads FBH, RBH or drum rims DR of the drum D. As shown in FIG. 10, dryer seals FS and RS can insulate the interior of the drum D to maintain the temperature differential and pressure differential between the interior of the drum and the environment surrounding the dryer, even when a fire has ignited within the drum D. Further, if the front dryer seal FS has a bearing therein as described above and due to the properties of the inorganic particles and, possibly, the properties of certain additives to the binder material of the heat resistant coating, air supply can be restricted by the swelling of the coated surfaces of the dryer seals FS and RS and the maintenance of the drum D in proper position without dropping to help smother any fire within the drum D.

Figure 11A:
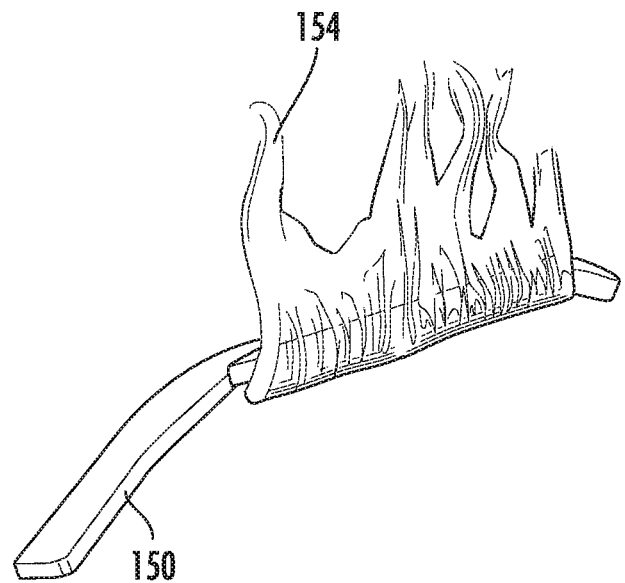
FIG. 11A illustrates an embodiment of a bearing for an embodiment of a dryer seal according to the present subject matter being subjected to a burning by a flame during a burn test.
Figure 11B:
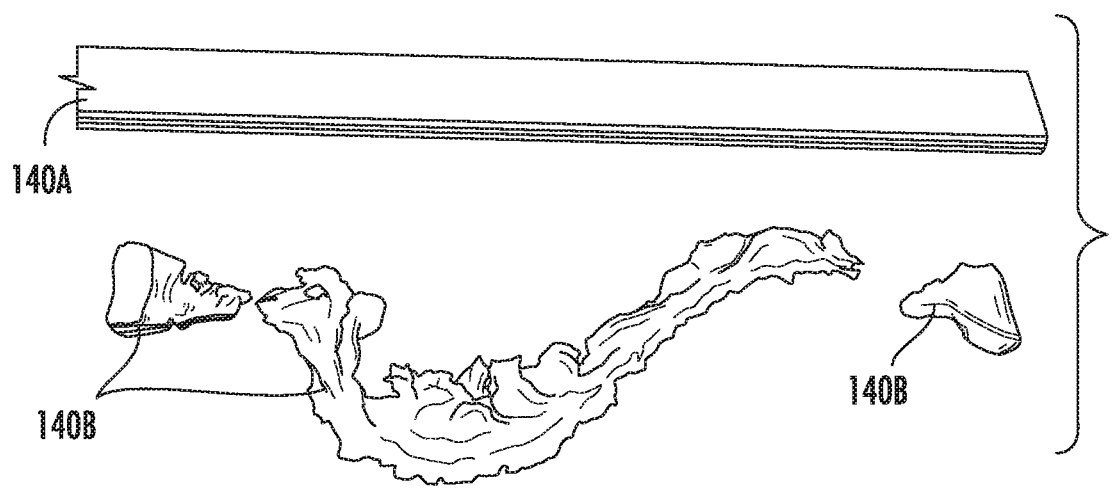
FIG. 11B illustrates an embodiment of a conventional bearing before being exposed to an open flame burn test and a conventional bearing of the same construction after being exposed to an open flame for approximately two (2) minutes.
Figure 11C:
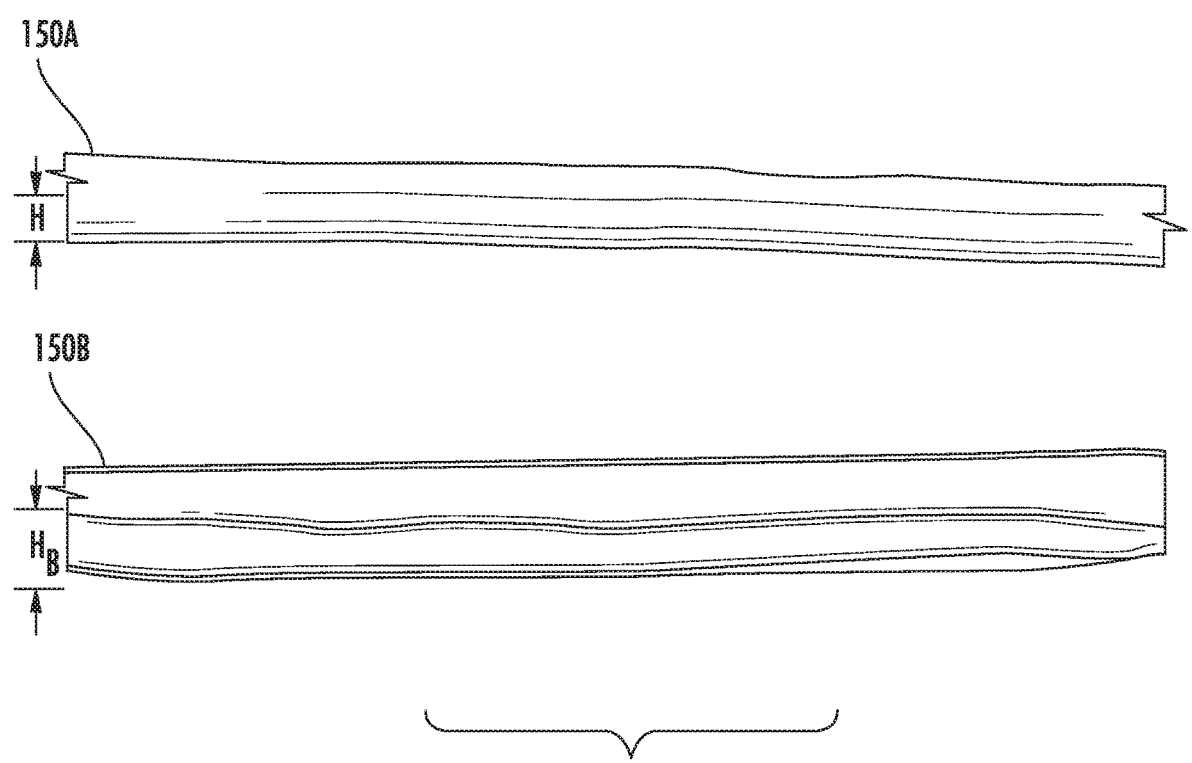
FIG. 11C illustrates an embodiment of a bearing for an embodiment of a dryer seal according to the present subject before being exposed to an open flame burn test and a bearing for an embodiment of a dryer seal according to the present subject after being exposed to an open flame for approximately one (1) hour (60 minutes).

FIGS. 11A-11C illustrate a burn test where a conventional bearing, such as 140A (see FIG. 11B), is subjected to exposure of an open flame of a propane fueled Bunsen burner and a new bearing, 150A (see FIG. 11C) comprising a needled nonwoven comprising wool fibers, PET fibers, silica fibers, and binder fibers and a GRP scrim as described in detail above is also subjected to the same open flame but for a more extended time. As shown in FIG. 11A, a new bearing block 150 (and the bearing 150A as shown in FIG. 11C) comprising a needled nonwoven comprising wool fibers. PET fibers, silica fibers, and binder fibers and a GRP scrim is subjected to an open flame 154 for an extended period of time to determine the bearing's ability to withstand exposure to extreme heat and flame. Similarly, a conventional bearing, such as bearing 140A as shown in FIG. 11B can be exposed to an open flame for a period of time to determine the conventional bearing's ability to withstand exposure to extreme heat and flame. As shown in FIG. 11B, conventional bearing 140B exposure to the burn test did not fare well. The conventional bearing 140B lost integrity and disintegrated after being exposed to the open flame for only two (2) minutes. Conversely, as shown in FIG. 11C, the new bearing 150B exposure to the burn test fared much better. The new bearing 1508 maintained a high integrity and did not lose any substantial size in the height direction even after being exposed to the open flame for sixty (60) minutes (one hour). Thus, it is clear, that the new bearing is superior to the conventional bearing in its ability to withstand exposure to extreme heat and flame.

As shown in FIG. 11C, the burnt bearing 150B still has a nominal height $H_B$ that was not reduced by any substantial amount even after carbonization caused by the burning the material of the bearing 150B. For example, the nominal height $H_B$ of the burnt bearing 150B shown in FIG. 11C can be substantially equal to the nominal height H of the bearing 150A that has not been subjected to extreme heat and flame shown in FIG. 11C. In some embodiments, the bearings as disclosed herein can actually grow in height after being carbonized by burning. The burnt bearing 150B can still provide a structural integrity that would allow it to bold the drum a dryer in or close to its operating position end prevent the drum from dropping. A dryer seal using a similar bearing was subjected to a full, 2158 Containment Test with the drum containing 6 lbs of load. The test appliance drum centerline was identified and calibrated prior to and subsequent to the test. It was found after the test that no discernible drum drop occurred and the bearing, similar to those described above, did not let the drum to drop even after exposure to extreme heat and flame.

These and other modifications and variations to the present subject matter may be practiced by those of ordinary skill in the art, without departing from the spirit and scope of the present subject matter, which is more particularly set forth herein above. In addition, it should be understood the aspects of the various embodiments may be interchanged both in whole or in part. Furthermore, those of ordinary skill in the art will appreciate that the foregoing description is by way of example only, and is not intended to limit the present subject matter.

What is claimed is:

1. A fire retardant dryer seal comprising:
   at least one outer base substrate having a first end and a second end, the at least one outer base substrate forming an outer surface of the dryer seal for contacting with portions of a dryer;
   at least one interior base substrate having a first surface and an opposing second surface, the at least one interior base substrate secured to the at least one outer base substrate;
   a bearing having a first end and a second end, the bearing comprising a needlepunched nonwoven comprising a reinforced scrim and silicon (Si)-containing fibers;
   the first end of the at least one outer base substrate secured to the first end of the bearing and the second end of the at least one outer base substrate secured to the second end of the bearing so that the bearing and the at least one outer base substrate form an annular shape; and
   a heat resistant coating disposed on at least one of the first surface or second surface of the at least one interior base substrate, the heat resistant coating comprising particles of an inorganic mineral material dispersed within a binder.

2. The fire retardant dryer seal as in claim 1, wherein the bearing further comprises at least one of wool fibers, PET fibers, or binder fibers that are blended together with the silicon-containing fibers and the reinforced scrim that comprises a glass reinforced plastic ("GRP") scrim therein to provide a thermally stable, structurally stable bearing material.

3. The fire retardant dryer seal as in claim 1, wherein the heat resistant coating is disposed on both the first and second surfaces of the at least one interior base substrate.

4. The fire retardant dryer seal as in claim 3, wherein the at least one interior base substrate is folded to form multiple layers of the heat resistant coating.

5. The fire retardant dryer seal as in claim 3, wherein the at least one interior base substrate is folded to form six layers of the heat resistant coating.

6. The fire retardant dryer seal as in claim 3, wherein the at least one interior base substrate comprises multiple interior base substrates that reside within a pocket of the at least one outer base substrate to form multiple layers of the heat resistant coating.

7. The fire retardant dryer seal according to claim 1, wherein the particles have an average thickness of less than about 50 nm, and wherein the particles have a larger dimension of about 0.5 µm to about 50 µm.

8. The fire retardant dryer seal according to claim 1, wherein the film-forming binder comprises at least one intumescent substance.

9. A fire retardant dryer seal comprising:
   an elongate, flexible first base substrate having a first end and a second end, the first base substrate comprising a first surface and a second surface opposite the first surface;
   a bearing having a first end and a second end, the bearing comprising a needlepunched nonwoven comprising a reinforced scrim and silicon (Si)-containing fibers; and
   the first end of the first substrate secured to the first end of the bearing and the second end of the first substrate secured to the second end of the bearing so that the bearing and the first substrate form an annular shape.

10. The fire retardant dryer seal as in claim 9, further comprising a heat resistant coating disposed on the first surface of the first base substrate.

11. The fire retardant dryer seal as in claim 10, wherein the bearing further comprises at least one of wool fibers, PET fibers, or binder fibers that are blended together with the silicon-containing fibers and the reinforced scrim that comprises a glass reinforced plastic ("GRP") scrim therein to provide a thermally stable, structurally stable bearing material.

12. The fire retardant dryer seal according to claim 9, wherein the bearing further comprises at least one of wool fibers, PET fibers, and binder fibers that are blended together with the silicon-containing fibers and the reinforced scrim that comprises a glass reinforced plastic ("GRP") scrim therein to provide a thermally stable, structurally stable bearing material.

13. The fire retardant dryer seal according to claim 10, wherein the heat resistant coating comprises particles of an inorganic mineral dispersed within a film-forming binder.

14. The fire retardant dryer seal according to claim 13, wherein the inorganic material comprises at least one of vermiculite, mica, clay materials, or calcium carbonate.

15. The fire retardant dryer seal according to claim 13, wherein the particles have an average thickness of less than about 50 nm, and wherein the particles have a largest dimension of about 0.5 µm to about 50 µm.

16. The fire retardant dryer seal according to claim 10, wherein the heat resistant coating comprises at least one intumescent substance.

17. The fire retardant dryer seal according to claim 10, wherein the first base substrate is folded and the first surface on which the heat resistant coating is disposed comprises an interior portion of the folded first substrate.

18. The fire retardant dryer seal according to claim 10, further comprising a second base substrate secured to the first base substrate, the second base substrate forming an outer surface of the dryer seal for contacting a portion of a dryer.

19. The fire retardant dryer seal according to claim 18, wherein the first and second surfaces of the first base substrate have a heat resistant coating thereon.

20. A bearing for a fire retardant dryer seal, the bearing comprising a needlepunched nonwoven comprising a reinforced scrim and silicon (Si)-containing fibers comprising a silicon or silicon compound, the bearing having a first end and a second end.

21. The bearing for the fire retardant dryer seal as in claim 20, wherein the bearing further comprises at least one of wool fibers, PET fibers, or binder fibers that are blended together with the silicon-containing fibers and the reinforced scrim that comprises a glass reinforced plastic ("GRP") scrim therein to provide a thermally stable, structurally stable bearing material.

22. The bearing for the fire retardant dryer seal according to claim 20, wherein the bearing further comprises wool fibers, PET fibers, and binder fibers that are blended together with the silicon-containing fibers and the reinforced scrim that comprises a glass reinforced plastic ("GRP") scrim therein to provide a thermally stable, structurally stable bearing material.

23. A method of making a fire retardant dryer seal, the method comprising:
    providing an elongate, flexible first base substrate having a first end and a second end, the first base substrate comprising a first surface and a second surface opposite the first surface;
    providing a bearing having a first end and a second end, the bearing comprising a needlepunched nonwoven comprising a reinforced scrim and silicon (Si)-containing fibers;
    securing the first end of the first substrate to the first end of the bearing; and
    securing the second end of the first substrate secured to the second end of the bearing so that the bearing and the first substrate form an annular shape.

* * * * *